United States Patent
Fan

(10) Patent No.: US 9,753,311 B2
(45) Date of Patent: Sep. 5, 2017

(54) EYE GLASSES WITH MICROPHONE ARRAY

(71) Applicant: Kopin Corporation, Westborough, MA (US)

(72) Inventor: Dashen Fan, Bellevue, WA (US)

(73) Assignee: Kopin Corporation, Westborough, MA (US)

( * ) Notice: Subject to any disclaimer, the term of this patent is extended or adjusted under 35 U.S.C. 154(b) by 47 days.

(21) Appl. No.: 14/180,994

(22) Filed: Feb. 14, 2014

(65) Prior Publication Data

US 2014/0270244 A1    Sep. 18, 2014

Related U.S. Application Data

(60) Provisional application No. 61/839,211, filed on Jun. 25, 2013, provisional application No. 61/780,108, (Continued)

(51) Int. Cl.
*H04R 1/02* (2006.01)
*H04R 3/00* (2006.01)
(Continued)

(52) U.S. Cl.
CPC ............ *G02C 11/10* (2013.01); *G10K 11/002* (2013.01); *H04R 1/028* (2013.01); *H04R 3/005* (2013.01);
(Continued)

(58) Field of Classification Search
CPC  G02B 2027/0178; G02C 11/10; G02C 11/06; H04R 1/028; H04R 3/005;
(Continued)

(56) References Cited

U.S. PATENT DOCUMENTS 3,378,649 A    4/1968 Mawby
3,789,163 A  *  1/1974 Dunlavy ............... G02C 11/06
                                               381/23.1
(Continued)

FOREIGN PATENT DOCUMENTS

CN    202 102 188       1/2012
EP    2 323 422 A1      5/2011
(Continued)

OTHER PUBLICATIONS

Office Action from U.S. Appl. No. 14/180,986, dated Nov. 21, 2014.
(Continued)

*Primary Examiner* — Thang Tran
(74) *Attorney, Agent, or Firm* — Hamilton, Brook, Smith & Reynolds, P.C.

(57) ABSTRACT

An eyewear device includes a noise cancelling microphone array, and corresponding method for the same. The eyewear device and its method of use facilitates human-machine interaction using speech recognition by reducing unwanted noise that corrupts the desired speech and thereby reduces errors in speech. The eyewear device includes an eyeglasses frame, an array of microphones coupled to the eyeglasses frame, the array of microphones including at least a first microphone and a second microphone, the first microphone coupled to the eyeglasses frame about a temple region, the temple region can be located approximately between a top corner of a lens opening and a support arm, and providing a first audio channel output, and the second microphone coupled to the eyeglasses frame about an inner edge of the lens opening, and providing a second audio channel output. Embodiments can further include a third and fourth omnidirectional microphone, providing a third and fourth audio channel, respectively.

21 Claims, 18 Drawing Sheets

Related U.S. Application Data filed on Mar. 13, 2013, provisional application No. 61/839,227, filed on Jun. 25, 2013, provisional application No. 61/912,844, filed on Dec. 6, 2013.

(51) Int. Cl.
| | | |
|---|---|---|
| *G02C 11/00* | | (2006.01) |
| *G10K 11/00* | | (2006.01) |
| *G02C 11/06* | | (2006.01) |
| *G10L 21/0208* | | (2013.01) |
| *G10L 21/0216* | | (2013.01) |

(52) U.S. Cl.
CPC .......... *G02C 11/06* (2013.01); *G10L 21/0208* (2013.01); *G10L 2021/02166* (2013.01); *Y10T 29/49826* (2015.01)

(58) Field of Classification Search
CPC .. H04R 25/405; H04R 25/407; H04R 25/604; H04R 17/02; H04R 29/0046; G10L 21/0208; G10L 2021/02166; G10K 11/002

See application file for complete search history.

(56) References Cited

U.S. PATENT DOCUMENTS

| | | | |
|---|---|---|---|
| 3,946,168 A | | 3/1976 | Preves |
| 4,773,095 A | * | 9/1988 | Zwicker .................. H04R 1/406 381/313 |
| 4,904,078 A | * | 2/1990 | Gorike .................. H04R 25/552 381/327 |
| 4,966,252 A | | 10/1990 | Drever |
| 6,091,546 A | | 7/2000 | Spitzer |
| 6,325,507 B1 | | 12/2001 | Jannard et al. |
| 6,349,001 B1 | | 2/2002 | Spitzer |
| 6,966,647 B2 | | 11/2005 | Jannard et al. |
| 7,004,582 B2 | | 2/2006 | Jannard et al. |
| 7,082,393 B2 | | 7/2006 | Lahr |
| 7,147,324 B2 | | 12/2006 | Jannard et al. |
| 7,150,526 B2 | | 12/2006 | Jannard et al. |
| 7,174,022 B1 | | 2/2007 | Zhang et al. |
| 7,213,917 B2 | | 5/2007 | Jannard et al. |
| 7,216,973 B2 | | 5/2007 | Jannard et al. |
| 7,219,994 B2 | | 5/2007 | Jannard et al. |
| 7,278,734 B2 | | 10/2007 | Jannard et al. |
| 7,359,504 B1 | | 4/2008 | Reuss et al. |
| 7,386,135 B2 | | 6/2008 | Fan |
| 7,445,332 B2 | | 11/2008 | Jannard et al. |
| 7,452,073 B2 | | 11/2008 | Jannard et al. |
| 7,461,936 B2 | | 12/2008 | Jannard |
| 7,494,216 B2 | | 2/2009 | Jannard et al. |
| 7,512,414 B2 | | 3/2009 | Jannard et al. |
| 7,682,018 B2 | | 3/2010 | Jannard |
| 7,744,213 B2 | | 6/2010 | Jannard et al. |
| 7,753,520 B2 | | 7/2010 | Fuziak, Jr. |
| 7,798,638 B2 | | 9/2010 | Fuziak, Jr. |
| 7,918,556 B2 | | 4/2011 | Lewis |
| 7,929,714 B2 | | 4/2011 | Bazarjani et al. |
| 7,959,084 B2 | | 6/2011 | Wulff |
| 7,966,189 B2 | | 6/2011 | Le et al. |
| 7,976,480 B2 | | 7/2011 | Grajales et al. |
| 7,988,283 B2 | | 8/2011 | Jannard |
| 8,020,989 B2 | | 9/2011 | Jannard et al. |
| 8,184,983 B1 | | 5/2012 | Ho et al. |
| 8,543,061 B2 | | 9/2013 | Suhami |
| 8,744,113 B1 | | 6/2014 | Rickards |
| 2002/0015008 A1 | | 2/2002 | Kishida et al. |
| 2003/0068057 A1 | | 4/2003 | Miller et al. |
| 2004/0001137 A1 | | 1/2004 | Cutler et al. |
| 2005/0069156 A1 | | 3/2005 | Haapapuro et al. |
| 2005/0248717 A1 | | 11/2005 | Howell et al. |
| 2005/0264527 A1 | | 12/2005 | Lin |
| 2006/0132382 A1 | | 6/2006 | Jannard |
| 2006/0285714 A1 | | 12/2006 | Akino |
| 2007/0160254 A1 | * | 7/2007 | Ritter .................. G02C 11/06 381/381 |
| 2008/0260189 A1 | * | 10/2008 | Schobben ............ H04R 25/405 381/313 |
| 2008/0317259 A1 | | 12/2008 | Zhang et al. |
| 2008/0317260 A1 | | 12/2008 | Short |
| 2009/0154719 A1 | | 6/2009 | Wulff et al. |
| 2010/0020229 A1 | | 1/2010 | Hershey et al. |
| 2010/0208928 A1 | | 8/2010 | Chene et al. |
| 2011/0001699 A1 | | 1/2011 | Jacobsen et al. |
| 2011/0091057 A1 | * | 4/2011 | Derkx .................. H04R 25/407 381/313 |
| 2011/0214082 A1 | | 9/2011 | Osterhout et al. |
| 2011/0221669 A1 | | 9/2011 | Shams et al. |
| 2011/0221671 A1 | | 9/2011 | King, III et al. |
| 2011/0227812 A1 | | 9/2011 | Haddick et al. |
| 2011/0227813 A1 | | 9/2011 | Haddick et al. |
| 2011/0255050 A1 | | 10/2011 | Jannard et al. |
| 2012/0056846 A1 | | 3/2012 | Zaliva |
| 2012/0062445 A1 | | 3/2012 | Haddick et al. |
| 2012/0075168 A1 | | 3/2012 | Osterhout et al. |
| 2012/0105740 A1 | | 5/2012 | Jannard et al. |
| 2012/0162259 A1 | * | 6/2012 | Sakai .................. H04R 1/028 345/634 |
| 2012/0282976 A1 | | 11/2012 | Suhami |
| 2013/0314280 A1 | | 11/2013 | Maltsev et al. |
| 2014/0268016 A1 | | 9/2014 | Chow et al. |
| 2014/0270316 A1 | | 9/2014 | Fan |
| 2014/0278385 A1 | | 9/2014 | Fan |

FOREIGN PATENT DOCUMENTS

| | | |
|---|---|---|
| EP | 2 469 323 A1 | 6/2012 |
| JP | 9252340 | 9/1997 |
| WO | WO 00/02419 | 1/2000 |
| WO | WO 2009/076016 | 6/2009 |
| WO | WO 2011/087770 A2 | 7/2011 |
| WO | WO 2012/040386 | 3/2012 |
| WO | WO 2012/097014 A1 | 7/2012 |
| WO | WO 2014/158426 A1 | 10/2014 |
| WO | WO 2014/163794 A2 | 10/2014 |
| WO | WO 2014/163796 A1 | 10/2014 |
| WO | WO 2014/163797 A1 | 10/2014 |

OTHER PUBLICATIONS

International Search Report and Written Opinion from PCT/US2014/016557, entitled "Sound Induction Ear Speaker for Eye Glasses", dated Sep. 24, 2014.

International Preliminary Report on Patentability for Int'l Application No. PCT/US2014/016547, titled: Sound Induction Ear Speaker for Eye Glasses; Date of Mailing: Sep. 15, 2015.

International Preliminary Report on Patentability for Int'l Application No. PCT/US2014/016557, titled: Sound Induction Ear Spectacle With Audio Speaker in the Temple; Date of Mailing: Sep. 15, 2015.

International Preliminary Report on Patentability for Int'l Application No. PCT/US2014/016558, titled: Eye Glasses With Microphone Array; Date of Mailing: Sep. 15, 2015.

International Preliminary Report on Patentability for Int'l Application No. PCT/US2014/016570, titled: Noise Cancelling Microphone Apparatus; Date of Mailing: Sep. 15, 2015.

International Search Report and Written Opinion for Int'l Application No. PCT/US2014/016547, titled: Sound Induction Ear Speaker for Eye Glasses; Date of Mailing: Apr. 29, 2015.

Office Action for U.S. Appl. No. 14/180,986, dated Jul. 16, 2015.

International Search Report and Written Opinion, PCT/US2014/016570, "Noise Cancelling Microphone Apparatus,", Date of Mailing Jun. 25, 2014.

Zhang, X., et al., "Noise Estimation Based on an Adaptive Smoothing Factor for Improving Speech Quality in a Dual-Microphone Noise Suppression System," Signal Processing and Communication Systems (ICSPCS), 5th International Conference, Dec. 12, 2011, pp. 1-5.

(56) References Cited

OTHER PUBLICATIONS

International Search Report and Written Opinion, PCT/US2014/016558, Entitled, "Eye Glasses with Microphone Array," Date of Mailing Jun. 25, 2014.
Office Action for U.S. Appl. No. 14/181,037, dated Jan. 6, 2016.
Office Action for U.S. Appl. No. 14/181,059, dated Feb. 16, 2016.
Final Office Action for U.S. Appl. No. 14/181,059, dated Aug. 16, 2016.
Non-Final Office Action for U.S. Appl. No. 14/181,059, dated Dec. 13, 2016.

* cited by examiner

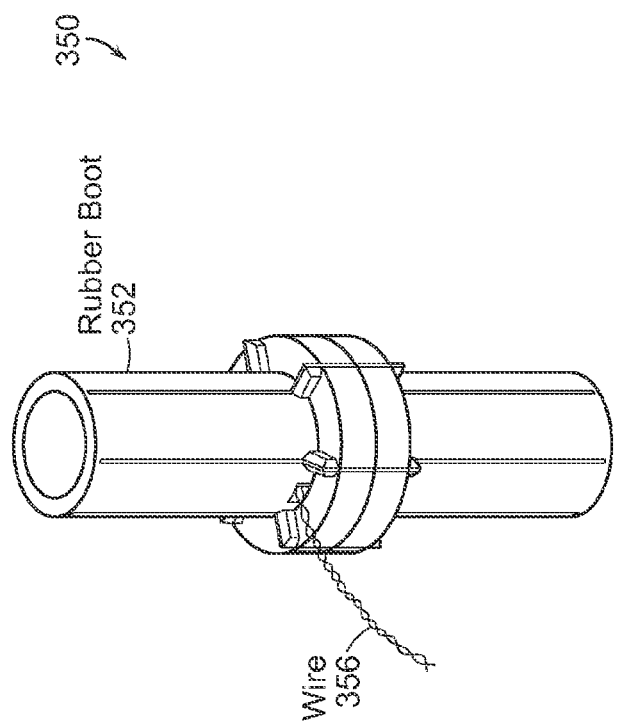
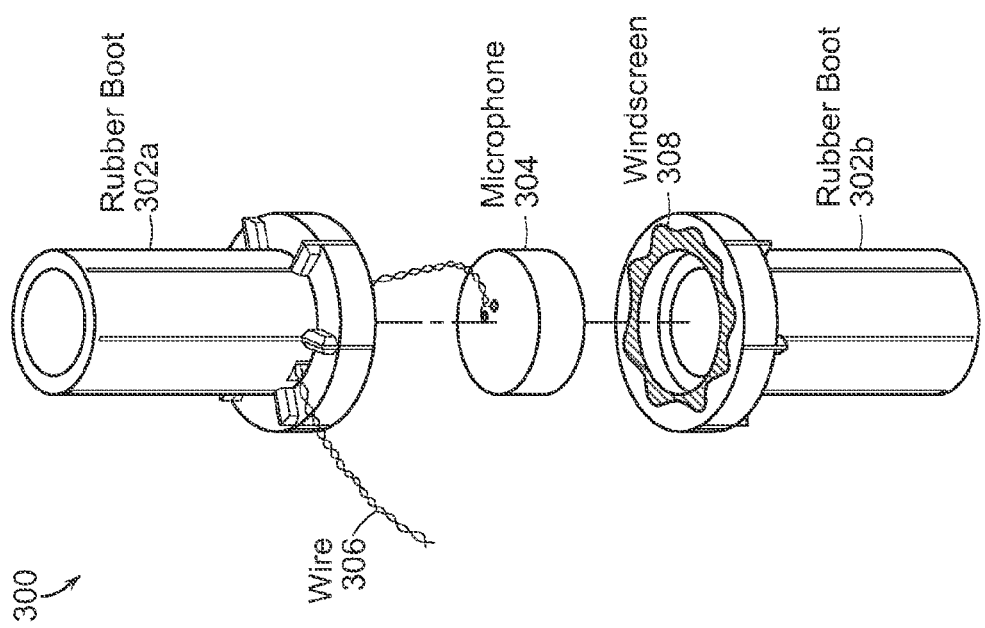
FIG. 3B
FIG. 3A

EYE GLASSES WITH MICROPHONE ARRAY

RELATED APPLICATIONS

This application claims the benefit of U.S. Provisional Application No. 61/839,211, filed on Jun. 25, 2013. This application also claims the benefit of U.S. Provisional Application No. 61/780,108, filed on Mar. 13, 2013. This application also claims the benefit of U.S. Provisional Application No. 61/839,227, filed on Jun. 25, 2013. This application also claims the benefit of U.S. Provisional Application No. 61/912,844, filed on Dec. 6, 2013.

This application was co-filed on the same day, Feb. 14, 2014, with "Sound Induction Ear Speaker For Eye Glasses" by Dashen Fan, U.S. application Ser. No. 14/180,986. This application was co-filed on the same day, Feb. 14, 2014, with "Eyewear Spectacle With Audio Speaker In The Temple" by Kenny W. Y. Chow, et al., U.S. application Ser. No. 14/181,037. This application was co-filed on the same day, Feb. 14, 2014, with "Noise Cancelling Microphone Apparatus" by Dashen Fan, U.S. application Ser. No. 14/181,059.

The entire teachings of the above applications are incorporated herein by reference.

BACKGROUND OF THE INVENTION

Human-machine interaction through a speech recognition user interface is becoming increasingly popular. To facilitate such human-machine interaction, accurate recognition of speech is useful. However, often unwanted noise from a user's environment corrupts the desired speech and thereby increases errors in speech recognition and increases the user frustration. Particular embodiments of eyewear devices with a noise cancelling microphone array using two bi-directional microphones coupled to an eyeglasses frame of the eyewear can be too large and too inflexible to be used for a consumer design which demands comfort and style.

Therefore, a need exists for eyewear that overcomes or minimizes the above-referenced problems.

SUMMARY OF THE INVENTION

The present invention generally is directed to an eyewear device that includes a noise device that includes a noise cancelling microphone array and a method of its use.

In one embodiment the eyewear device of the invention includes an array of microphones coupled to at least one of a front frame and at least one side frame member, the array of microphones including at least a first and second microphone. The first microphone is located at a temple region between a top corner of a lens opening defined by the front frame, and the at least one side frame member. The second microphone is located at an inner edge of the lens opening. First and second audio channel outputs extend from the first and second microphones, respectively.

In another embodiment, the eyewear device includes a digital signal processor (DSP) having a beam-former electronically linked to the first and second microphones for receiving at least the first and second audio channels and outputting a main channel and one or more reference channels. A voice activity detector is electronically linked to the beam-former for receiving the main and reference channels and outputting a desired voice activity channel, and an adaptive noise canceller electronically linked to the beam-former and the voice activity detector for receiving the main, reference and desired voice activity channels and outputting an adaptive noise cancellation channel, and a noise reducer electronically linked to the voice activity detector in the adaptive noise canceller for receiving the desired voice activity and adaptive noise cancellation channels, and outputting the desired speech channel.

In yet another embodiment, the invention includes a method of reducing noise in an eyewear device with a microphone array, including the steps of coupling an array of microphones to an eyeglasses frame, the array of microphones including at least a first microphone and a second microphone. A first microphone is arranged to couple to the eyeglasses frame about a temple region, the temple region being located to approximately between the top corner of a lens opening and the support arm. The second microphone is arranged to couple to the eyeglasses frame about an inner edge of the lens opening. First and second audio channel outputs are provided from the first and second microphones, respectively.

In yet another embodiment, the invention includes reducing noise by use of an eyewear device, as described herein, and further including the steps of forming beams with a beam-former, the beam-former receiving at least the first and second audio channels and outputting a main channel and one or more reference channels. Voice activity is detected in a voice activity detector, the voice activity detector receiving the main reference channels and outputting the desired voice activity channel. Noise is adaptively canceled at an adaptive noise canceller, the adaptive noise canceller receiving the main, reference and desired voice activity channels and outputting an adaptive noise cancellation channel. Noise is reduced at a noise reducer receiving a desired voice activity channel and the adaptive noise cancellation channel, and outputting a desired speech channel.

This invention has many advantages. For example, the audio device of the invention, by virtue of the microphone array, improves accurate recognition of speech by minimizing unwanted noise, particularly in those embodiments that employ a digital signal processor that actively cancels unwanted noise, thereby decreasing errors in such speech recognition. Further, the present invention integrates the microphone array and digital signal processor in a convenient and comfortable format for everyday use.

BRIEF DESCRIPTION OF THE FIGURES

FIG. 3A is a diagram illustrating an example of a rubber boot shown in an exploded view.

FIG. 3B is a diagram illustrating the rubber boot of FIG. 3A when assembled.

DETAILED DESCRIPTION OF THE INVENTION

The foregoing will be apparent from the following more particular description of example embodiments invention, as illustrated in the accompanying drawings in which like references refer to the same parts throughout the different views. The drawings are not necessarily to scale, emphasis instead being placed upon illustrating embodiments of the present invention.

The invention generally is directed to an eyewear device with a noise cancelling microphone array optionally including a digital signal processor that reduces noise, and to methods of its use.

Figure 1:
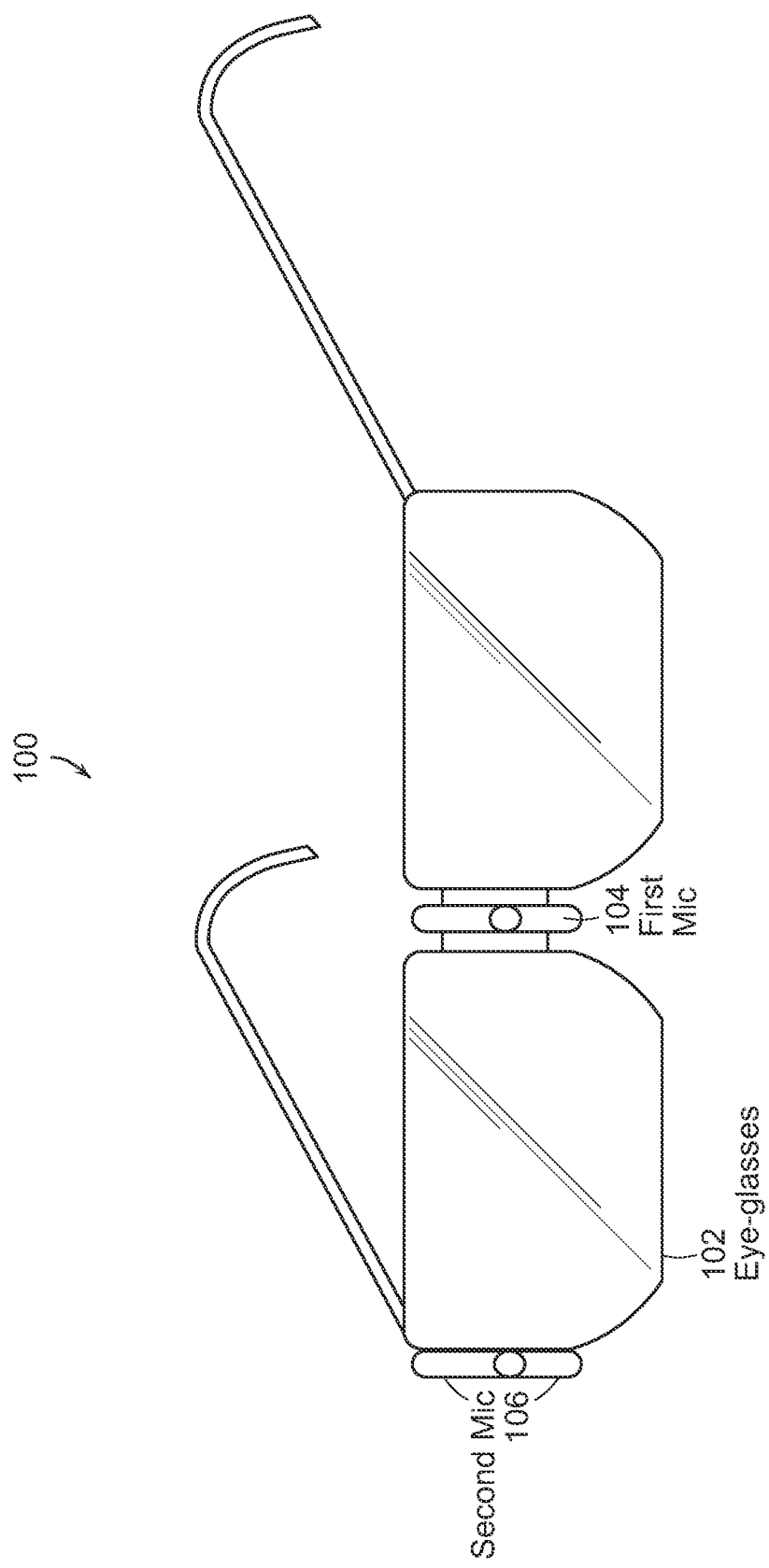
FIG. 1 is a diagram illustrating an embodiment of eyeglasses of the invention having two embedded microphones.

FIG. 1 is an illustration of an example of one embodiment of an eyewear device 100 of the invention. As shown therein, eyewear device 100 includes eye-glasses 102 having embedded microphones. The eye-glasses 102 have two microphones 104 and 106. First microphone 104 is arranged in the middle of the eye-glasses 102 frame. Second microphone 106 is arranged on the side of the eye-glasses 102 frame. The microphones 104 and 106 can be pressure-gradient microphone elements, either bi- or uni-directional. Each microphone 104 and 106 is a microphone assembly within a rubber boot, as described more particularly infra with reference to FIGS. 3A and 3B. The rubber boot provides an acoustic port on the front and the back side of the microphone with acoustic ducts. The two microphones 104 and 106 and their respective boots can be identical. The microphones 104 and 106 can be sealed air-tight (e.g., hermetically sealed). The acoustic ducts are filled with windscreen material. The ports are sealed with woven fabric layers. The lower and upper acoustic ports are sealed with a water-proof membrane. The microphones can be built into the structure of the eye glasses frame. Each microphone has top and bottom holes, being acoustic ports. In an embodiment, the two microphones 104 and 106, which can be pressure-gradient microphone elements, can each be replaced by two omni-directional microphones.

Figure 2:
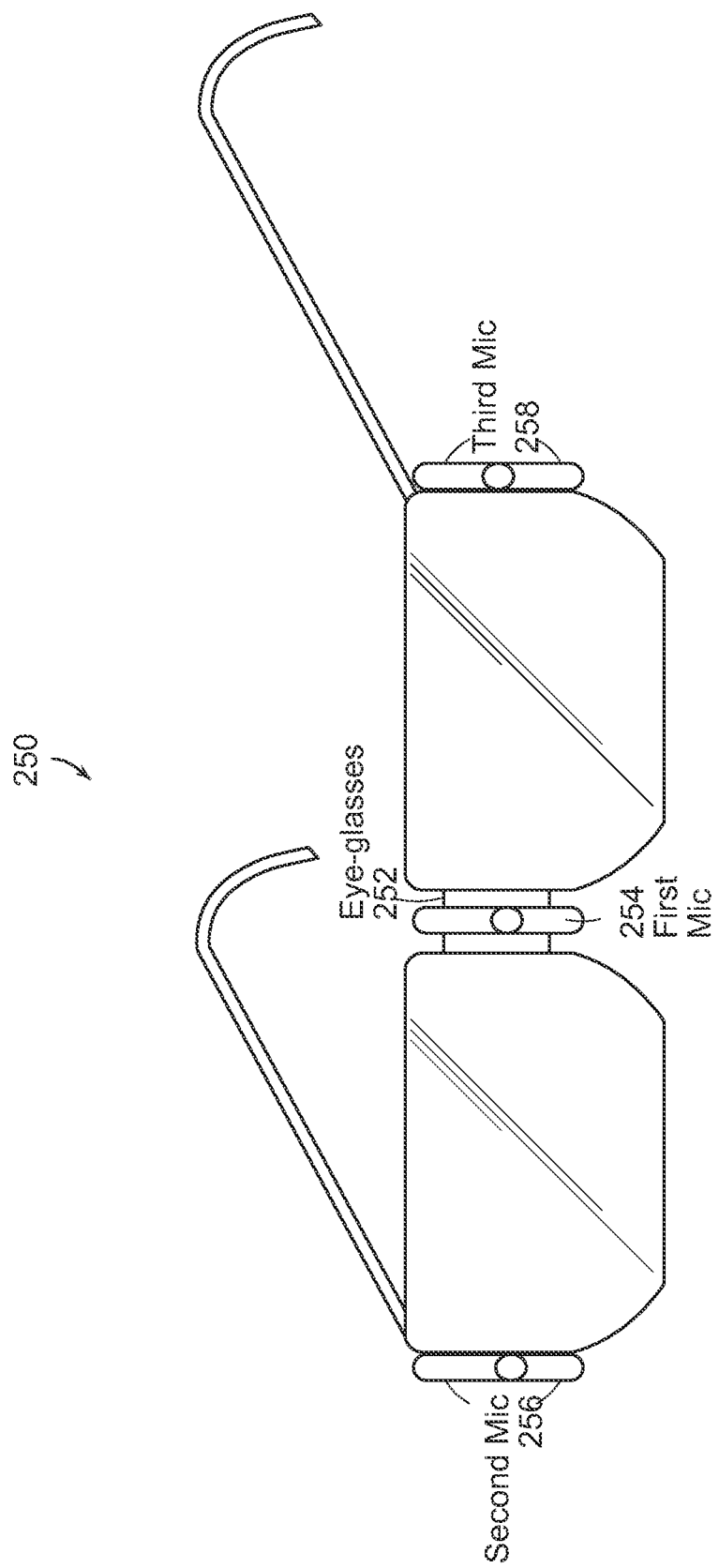
FIG. 2 is a diagram illustrating an embodiment of eyeglasses of the invention having three embedded microphones.

FIG. 2 is an illustration of another example of an embodiment of the invention. As shown in FIG. 2, eyewear device 250 includes eye-glasses 252 having three embedded microphones. The eye-glasses 252 of FIG. 2 are similar to the eye-glasses 102 of FIG. 1, but instead employs three microphones instead of two. The eye-glasses 252 of FIG. 2 have a first microphone 254 arranged in the middle of the eye-glasses 252, a second microphone 256 arranged on the left side of the eye-glasses 252, and a third microphone 258 arranged on the right side of the eye-glasses 252. The three microphones can be employed in the three-microphone embodiment described above.

FIG. 3A is an exploded view of microphone assembly 300 of the invention. As shown therein, rubber boot 302a-b is separated into a first half of the rubber boot 302a and a second half of the rubber boot 302b. A microphone 301 is between the rubber boot halves. Each rubber boot 302a-b is lined by a windscreen 308 material. FIG. 3A shows the windscreen in the second half of the rubber boot 302b. In a pressure-gradient microphone, the air-duct and the open space between acoustic port and boom interior is filled with windscreen foam material, such as wind guard sleeves over the rubber boots.

Microphone 304 is arranged to be placed between the two halves of the rubber boot 302a-b. The microphone 304 and rubber boot 302a-b are sized such that the microphone 304 fits in a cavity within the halves of the rubber boot 302a-b. The microphone is coupled with a wire 306, that extends out of the rubber boot 302a-b and can be connected to, for instance, a noise cancellation circuit, such as is described below, with reference to FIGS. 11 through 14.

FIG. 3B is a perspective view of the microphone assembly 300 when assembled. The rubber boot 352 of FIG. 3B is shown to have both halves 300a-b of FIG. 3A joined together, where a microphone (not shown) is inside. A wire 356 coupled to the microphone exits the rubber boot 352 such that it can be connected to, for instance, the noise cancellation circuit described below.

Figure 4:
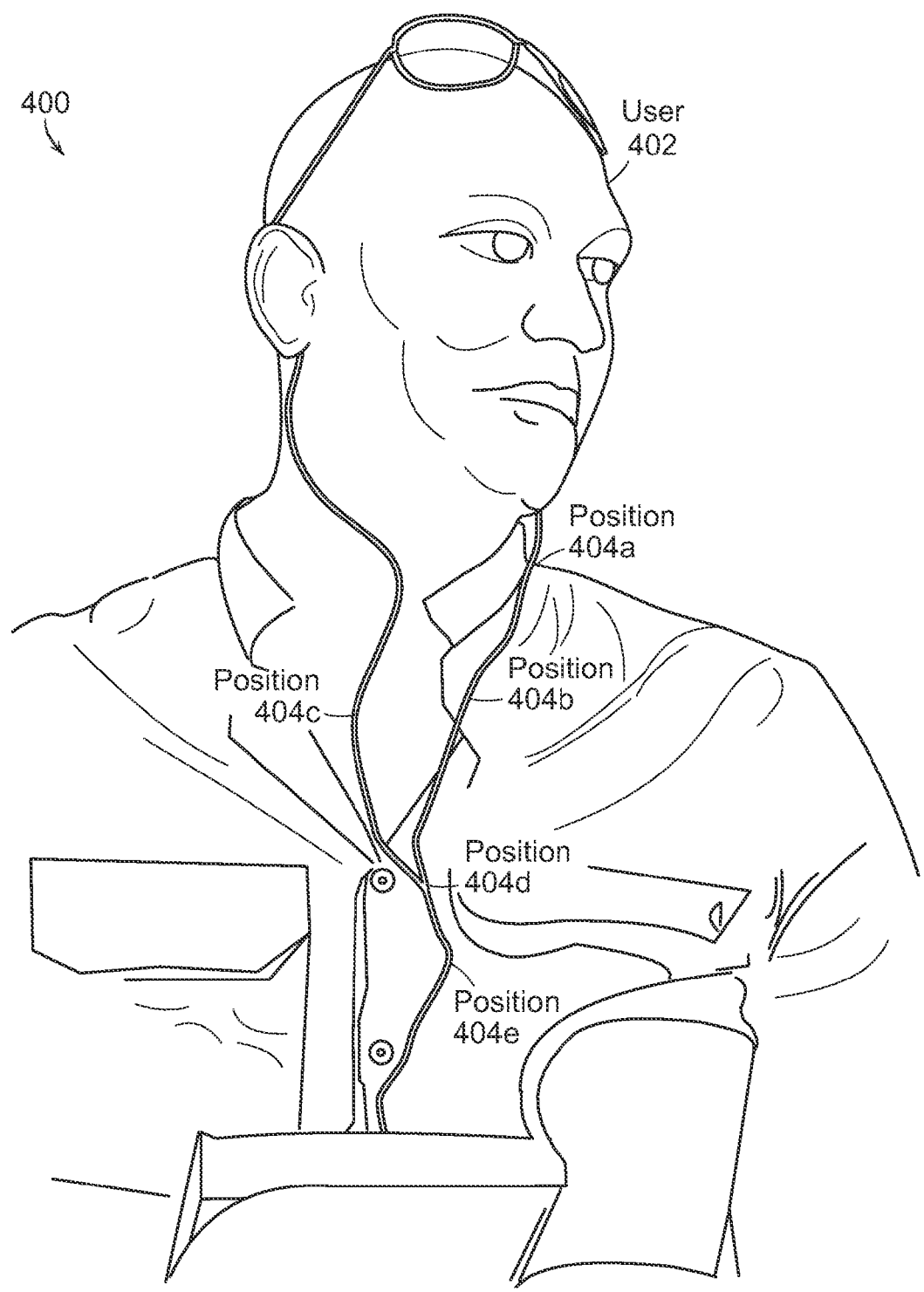
FIG. 4 is an illustration of an embodiment of the invention showing various optional positions of placement of microphones according to the invention.

FIG. 4 is an illustration of an embodiment of the invention 300 showing various optional positions of placement of the microphones 404a-e. As described above, the microphones are pressure-gradient. In an embodiment, microphones can be placed in any of the locations shown in FIG. 4, or any combination of the locations shown in FIG. 4. In a two-microphone system, the microphone closest to the user's mouth is referred to as MIC1, the microphone further from the user's mouth is referred to as MIC2. In an embodiment, both MIC1 & MIC2 can be inline at position 1404a. In other embodiments, the microphones can be positioned as follows:

MIC1 at position 1 404a and MIC2 at position 2 404b;
MIC1 at position 1 404a and MIC2 at position 3 404c;
MIC1 at position 1 404a and MIC2 at position 4 404d;
MIC1 at position 4 404d and MIC2 at position 5 404e;

Both MIC1 and MIC2 at position 4 404*d*.

If position 4 404*d* has a microphone, it is employed within a pendant.

The microphones can also be employed at other combinations of positions 404*a-e*, or at positions not shown in FIG. 4.

Each pressure-gradient microphone element can be replaced with two omni-directional microphones at the location of each acoustic port, resulting in four total microphones. The signal from these two omni-directional microphone can be processed by electronic or digital beamforming circuitry described above to produce a pressure gradient beam pattern. This pressure gradient beam pattern replaces the equivalent pressure-gradient microphone.

In an embodiment of the present invention, if a pressure-gradient microphone is employed, each microphone is within a rubber boot that extends an acoustic port on the front and the back side of the microphone with acoustic ducts. At the end of rubber boot, the new acoustic port is aligned with the opening in the tube, where empty space is filled with windscreen material. If two omni-directional microphones are employed in place of one pressure-gradient microphone, then the acoustic port of each microphone is aligned with the opening.

In an embodiment, a long boom dual-microphone headset can look like a conventional close-talk boom microphone, but is a big boom with two-microphones in parallel. An end microphone of the boom is placed in front of user's mouth. The close-talk long boom dual-microphone design targets heavy noise usage in military, aviation, industrial and has unparalleled noise cancellation performance. For example, one main microphone can be positioned directly in front of mouth. A second microphone can be positioned at the side of the mouth. The two microphones can be identical with identical casing. The two microphones can be placed in parallel, perpendicular to the boom. Each microphone has front and back openings. DSP circuitry can be in the housing between the two microphones.

Microphone is housed in a rubber or silicon holder (e.g., the rubber boot) with an air duct extending to the acoustic ports as needed. The housing keeps the microphone in an air-tight container and provides shock absorption. The microphone front and back ports are covered with a windscreen layer made of woven fabric layers to reduce wind noise or windscreen foam material. The outlet holes on the microphone plastic housing can be covered with water-resistant thin film material or special water-resistant coating.

In another embodiment, a conference gooseneck microphone can provide noise cancellation. In large conference hall, echoes can be a problem for sound recording. Echoes recorded by a microphone can cause howling. Severe echo prevents the user from tuning up speaker volume and causes limited audibility. Conference hall and conference room can be decorated with expensive sound absorbing materials on their walls to reduce echo to achieve higher speaker volume and provide an even distribution of sound field across the entire audience. Electronic echo cancellation equipment is used to reduce echo and increase speaker volume, but such equipment is expensive, can be difficult to setup and often requires an acoustic expert.

In an embodiment, a dual-microphone noise cancellation conference microphone can provide an inexpensive, easy to implement solution to the problem of echo in a conference hall or conference room. The dual-microphone system described above can be placed in a desktop gooseneck microphone. Each microphone in the tube is a pressure-gradient bi-directional, uni-directional, or super-directional microphone.

Figure 5:
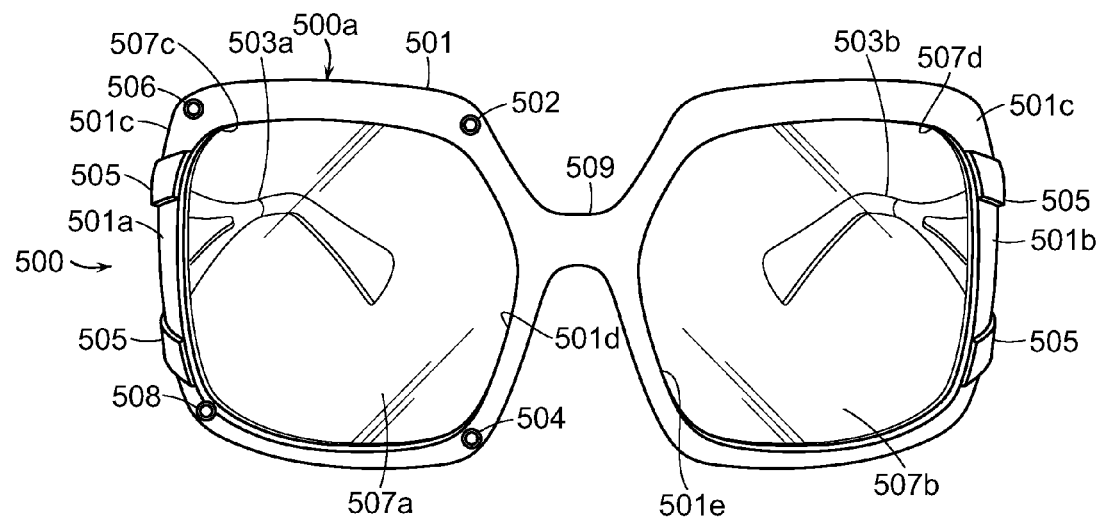
FIG. 5 is an illustration of another embodiment of the invention employing four omni directional microphones at four acoustic ports in place of two bidirectional microphones.

FIG. 5 is an illustration of an embodiment of eyewear 500 of the present invention. Eyewear 900 includes eyeglasses frame 500*a* having front frame 501 that defines opposite ends 501*a* and 501*b*, and at least one top corner 501*c* proximate to at least one of the opposite ends 501*a*, 501*b*, and inner edges 501*d*, 501*e*. Inner edges 501*d*, 501*e* define openings 507*a*, 507*b*, which are spanned by bridge support region 509. Openings 507*a*, 507*b* include top corners, 507*c*, 507*d*. Four omni-directional microphones 502, 504, 506, 508, and electronic beam steering replace the two bidirectional microphones shown in FIG. 1. Replacing the two bi-directional microphones with four omni-directional microphones provides eyewear frame designers more flexibility and manufacturability. In example embodiments having four omni-directional microphones, the four omni-directional microphones can be located anywhere on the eyewear frame, preferably with the pairs of microphones lining up vertically about a lens. Microphone 506 is located at a juncture 505 between front frame member 501 and side frame member 503*a*. In this embodiment, omni-directional second microphones 502 and 504 are located at inner edge 501*d* and are main microphones for detecting the primary sound that is to be separated from interference. Microphone 506 is a reference microphone that detects background noise that is to be separated from the primary sound. The array of microphones can be omni directional microphones, wherein the omni-directional microphones can be any combination of the following: electret condenser microphones, analog microelectromechanical systems (MEMS) microphones, or digital MEMS microphones.

Figure 6:
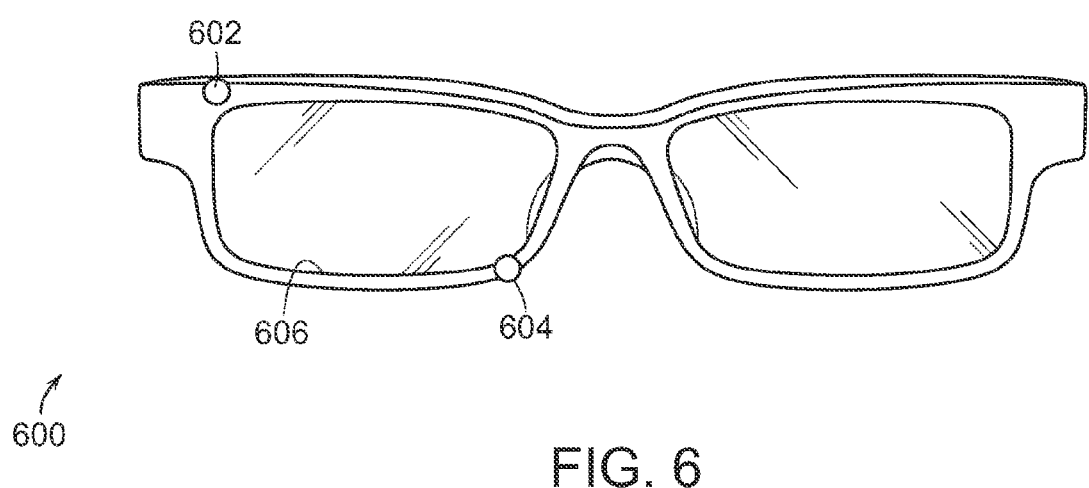
FIG. 6 is a schematic representation of eyewear of the invention employing two omni directional microphones placed diagonally across the lens opening defined by the front frame of the eyewear.

Another example embodiment of the present invention, shown in FIG. 6, includes an eyewear device with a noise cancelling microphone array, the eyewear device including an eyeglasses frame 600, an array of microphones coupled to the eyeglasses frame, the array of microphones including at least a first microphone 602 and a second microphone 604, the first microphone coupled to the eyeglasses frame about a temple region, the temple region can be located approximately between a top corner of a lens opening and a support arm, and providing a first audio channel output, and the second microphone coupled to the eyeglasses frame about an inner lower corner of the lens opening, and providing a second audio channel output. The second microphone is located diagonally across lens opening 606, although it can be positioned anywhere along the inner frame of the lens, for example the lower corner, upper corner, or inner frame edge. Further, the second microphone can be along the inner edge of the lens at either the left or right of the nose bridge.

Figure 7:
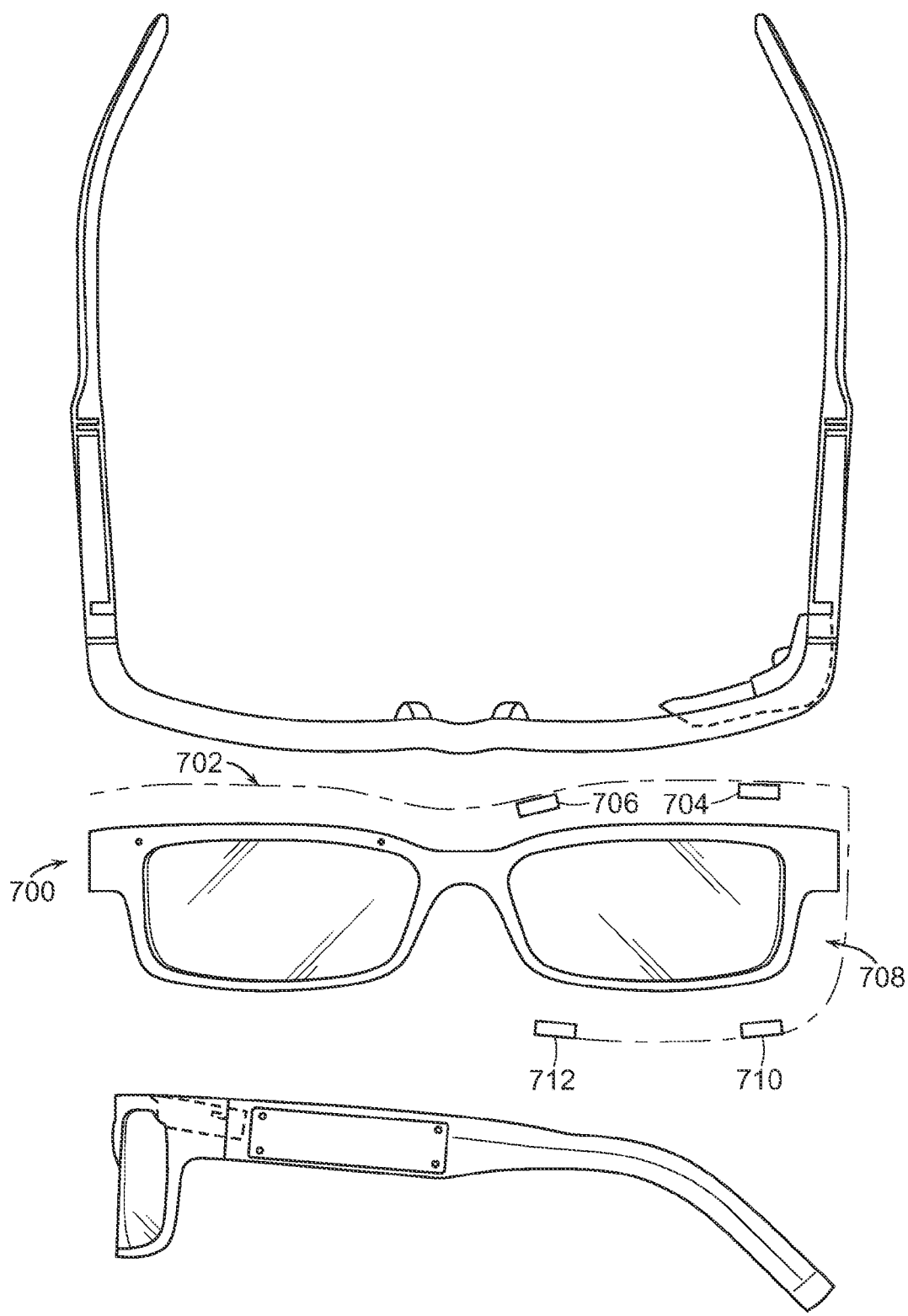
FIG. 7 is an illustration of another embodiment of the invention employing four omni directional microphones placed along the top and bottom portions of the eyeglasses frame.

In yet another embodiment of the invention, the array of microphones can be coupled to the eyeglasses frame using at least one flexible printed circuit board (PCB) strip, as shown in FIG. 7. In this embodiment, eyewear device of the invention 700 includes upper flexible PCB strip 702 including the first 704 and fourth 706 microphones and a lower flexible PCB strip 708 including the second 710 and third 712 microphones.

Figure 8:
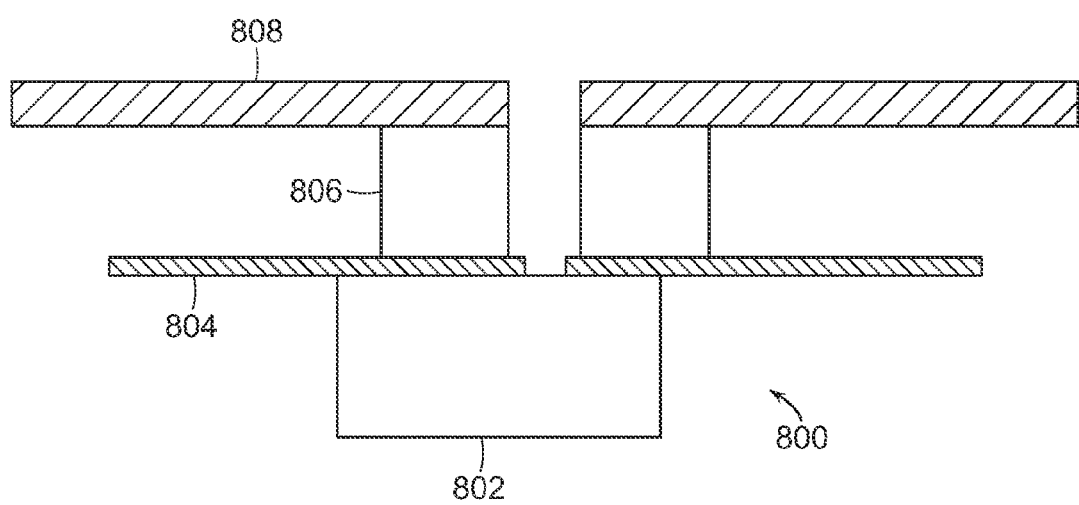
FIG. 8 is a schematic representation of one embodiment of a direct acoustic port suitable for use with the invention.

In further example embodiments, the eyeglasses frame can further include an array of vents corresponding to the array of microphones. The array of microphones can be bottom port or top port microelectromechanical systems (MEMS) microphones. As can be seen in FIG. 8, which is a microphone component of the eyewear of FIG. 7, MEMS microphone component 800 includes MEMS microphone 802 is affixed to flexible printed circuit board (PCB) 804. Gasket 806 separates flexible PCB 804 from device case 808. Vent 810 is defined by flexible PCB 804, gasket 806 and device case 808. Vent 810 is an audio canal to channel audio waves to MEMS microphone 802. The first and fourth MEMS microphones can be coupled to the upper flexible PCB strip, the second and third MEMS microphones can be coupled to the lower flexible PCB strip, and the array of MEMS microphones can be arranged such that the bottom ports or top ports receive acoustic signals through the corresponding vents.

Figure 9:
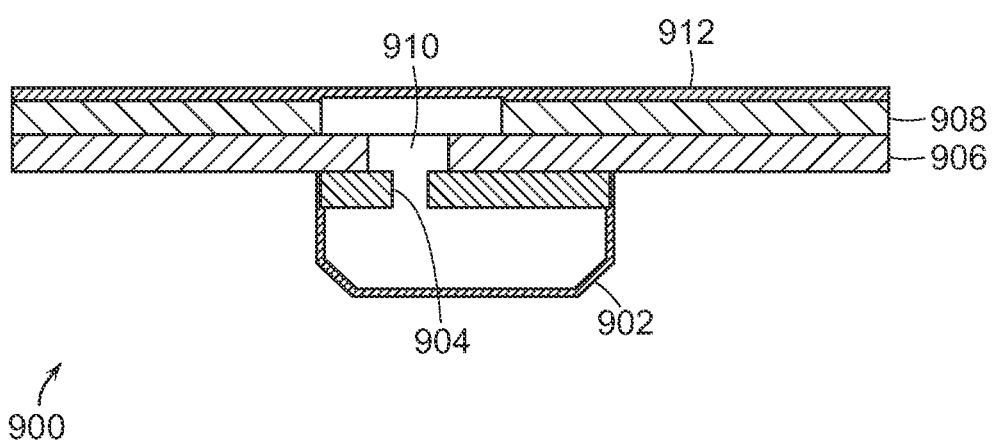
FIG. 9 is a schematic representation of an acoustic port with a wind-screen suitable for use in the eyewear of the invention.

Another embodiment can further include a membrane to protect against wind and rain, for example. For example, as can be seen in FIG. 9, microphone component 900 includes microphone 902 that defines sound port 904. Flexible printed circuit board (PCB) 806 is affixed to microphone 902. Washer 908 overlays flex-PCB 906, and can be manufactured if, for example, silicon rubber. Flex-PCB 906 and washer 908 defines cavity 910. Protective member 912 overlays washer 908 to protect against environmental factors, such as wind and rain. Alternatively, member 912 can be sandwiched between the eyeglasses frame and the PCB strips in the bottom port case; or between the eyeglasses frame and MEMS microphone in the top port case.

Figure 10:
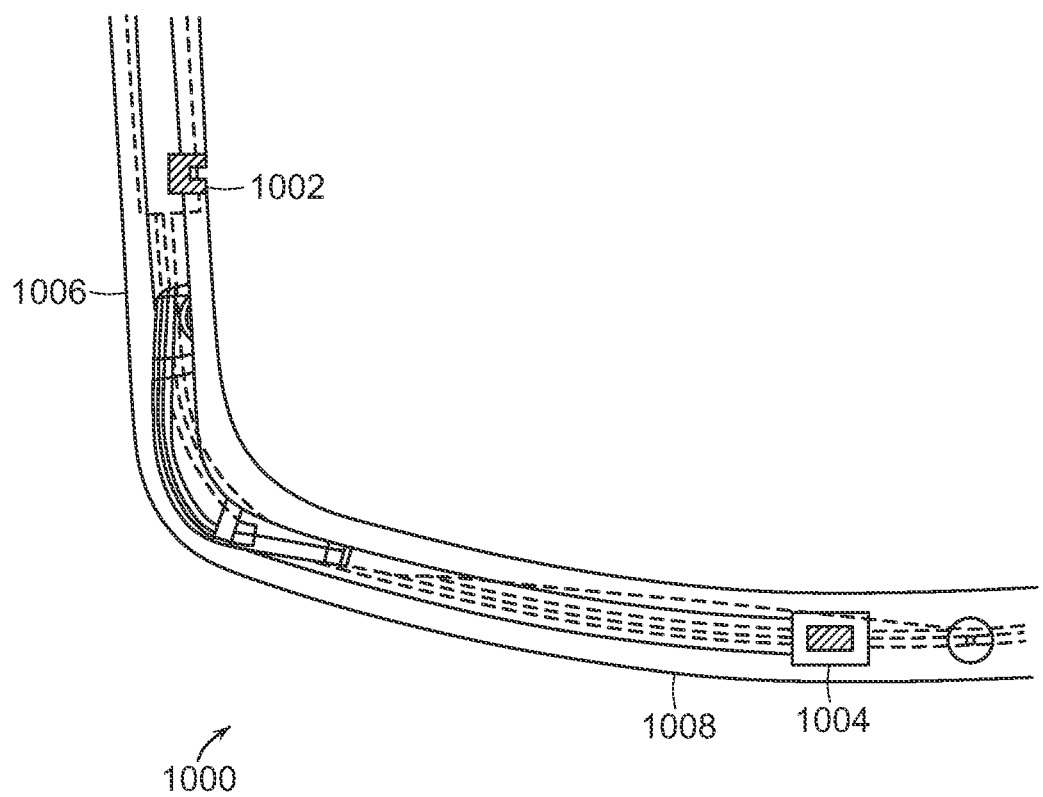
FIG. 10 is an illustration of another embodiment of the invention wherein microphones have been placed at a temple portion of the eyewear facing inward and at a lower center corner of the front frame of the eyewear and facing down.

FIG. 10 shows another alternate embodiment of eyewear 1000 where microphones 1002, 1004 are placed at the temple region 1006 and front frame 1008, respectively.

Figure 11:
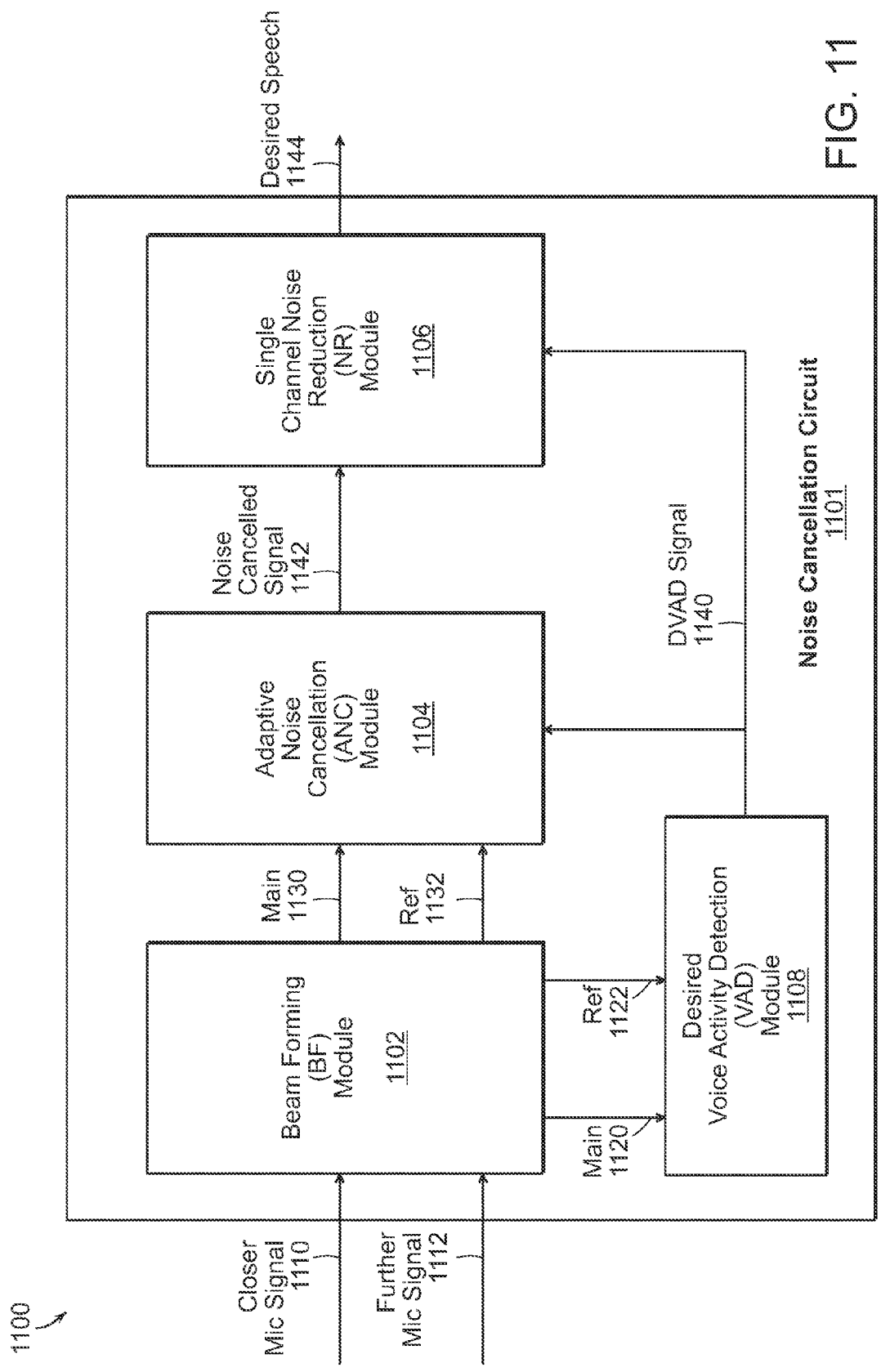
FIG. 11 is a block diagram illustrating an example embodiment of a noise cancellation circuit employed in an embodiment of the invention.

FIG. 11 is a block diagram illustrating an example embodiment of a noise cancellation circuit 1100 employed in the present invention. As shown therein, signals 1110 and 1112 from two microphones are digitized and fed into the noise cancelling circuit 1101. The noise cancelling circuit 1101 can be a digital signal processing (DSP) unit (e.g., software executing on a processor, hardware block, or multiple hardware blocks). In an embodiment, the noise cancellation circuit 1101 can be a digital signal processing (DSP) chip, a system-on-a-chip (SOC), a Bluetooth chip, a voice CODEC with DSP chip, etc. The noise cancellation circuit 1101 can be located in a Bluetooth headset near the user's ear, in an inline control case with battery, or inside the connector, etc. The noise cancellation circuit 1101 can be powered by a battery (not shown) or by a power source (not shown) of the device that the headset is connected to, such as the device's batter, or power from a USB, micro-USB, or Lightening connector.

The noise cancellation circuit 1101 includes four functional blocks: a beam-forming (BF) module 1102, a Desired Voice Activity Detection (VAD) Module 1108, an adaptive noise cancellation (ANC) module 1104 and a single signal noise reduction (NR) module 1106. The two signals 1110 and 1112 are fed into the BF module 1102, which generates a main signal 1130 and a reference signal 1132 to the ANC module 1104. A closer microphone signal 1110 is collected from a microphone closer to the user's mouth and a further microphone signal is collected from a microphone further from the user's mouth, relatively. The BF module 1102 also generates a main signal 1120 and reference signal 1122 for the desired VAD module 1108. The main signal 1120 and reference signal 1122 can, in certain embodiments, be different from the main signal 1130 and reference signal 1132 generated for the for ANC module 1104.

The ANC module 1104 processes the main signal 1130 and the reference signal 1132 to cancel out noises from the two signals and output a noise cancelled signal 1142 to the single channel NR module 1106. The single signal NR module 1106 post-processes the noise cancelled signal 1142 from the ANC module 1104 to remove any further residue noises. Meanwhile, the VAD module 1108 derives, from the main signal 1120 and reference signal 1122, a desired voice activity detection (DVAD) signal 1140 that indicates the presence or absence of speech in the main signal 1120 and reference signal 1122. The DVAD signal 1140 can then be used to control the ANC module 1104 and the NR module 1106 from the result of BF module 1102. The DVAD signal 1140 indicates to the ANC module 1104 and the Single Channel NR module 1106 which sections of the signal have voice data to analyze, which can increase the efficiency of processing of the ANC module 1104 and single channel NR module 1106 by ignoring sections of the signal without voice data. Desired speech signal 1144 is generated by single channel NR module 1106.

In an embodiment, the BF module 1102, ANC module 1104, single NR reduction module 1106, and desired VAD module 1108 employ linear processing (e.g., linear filters). A linear system (which employs linear processing) satisfies the properties of superposition and scaling or homogeneity. The property of superposition means that the output of the system is directly proportional to the input. For example, a function F(x) is a linear system if:

$$F(x_1+x_2+ \ldots )=F(x_1)+F(x_2)+ \ldots$$

A satisfies the property of scaling or homogeneity of degree one if the output scales proportional to the input. For example, a function F(x) satisfies the properties of scaling or homogeneity if, for a scalar α:

$$F(\alpha x)=\alpha F(x)$$

In contract, a non-linear function does not satisfy both of these conditions.

Prior noise cancellation systems employ non-linear processing. By using linear processing, increasing the input changes the output proportionally. However, in non-linear processing, increasing the input changes the output non-proportionally. Using linear processing provides an advantage for speech recognition by improving feature extraction. Speaker recognition algorithm is developed based on noiseless voice recorded in quiet environment with no distortion. A linear noise cancellation algorithm does not introduce nonlinear distortion to noise cancelled speech. Speech recognition can deal with linear distortion on speech, but not non-linear distortion of speech. Linear noise cancellation algorithm is "transparent" to the speech recognition engine. Training speech recognition on the variations of nonlinear distorted noise is impossible. Non-linear distortion can disrupt the feature extraction necessary for speech recognition.

An example of a linear system is a Weiner Filter, which is a linear single channel noise removal filter. The Wiener filter is a filter used to produce an estimate of a desired or target random process by linear time-invariant filtering an observed noisy process, assuming known stationary signal, noise spectra, and additive noise. The Wiener filter minimizes the mean square error between the estimated random process and the desired process.

Figure 12:
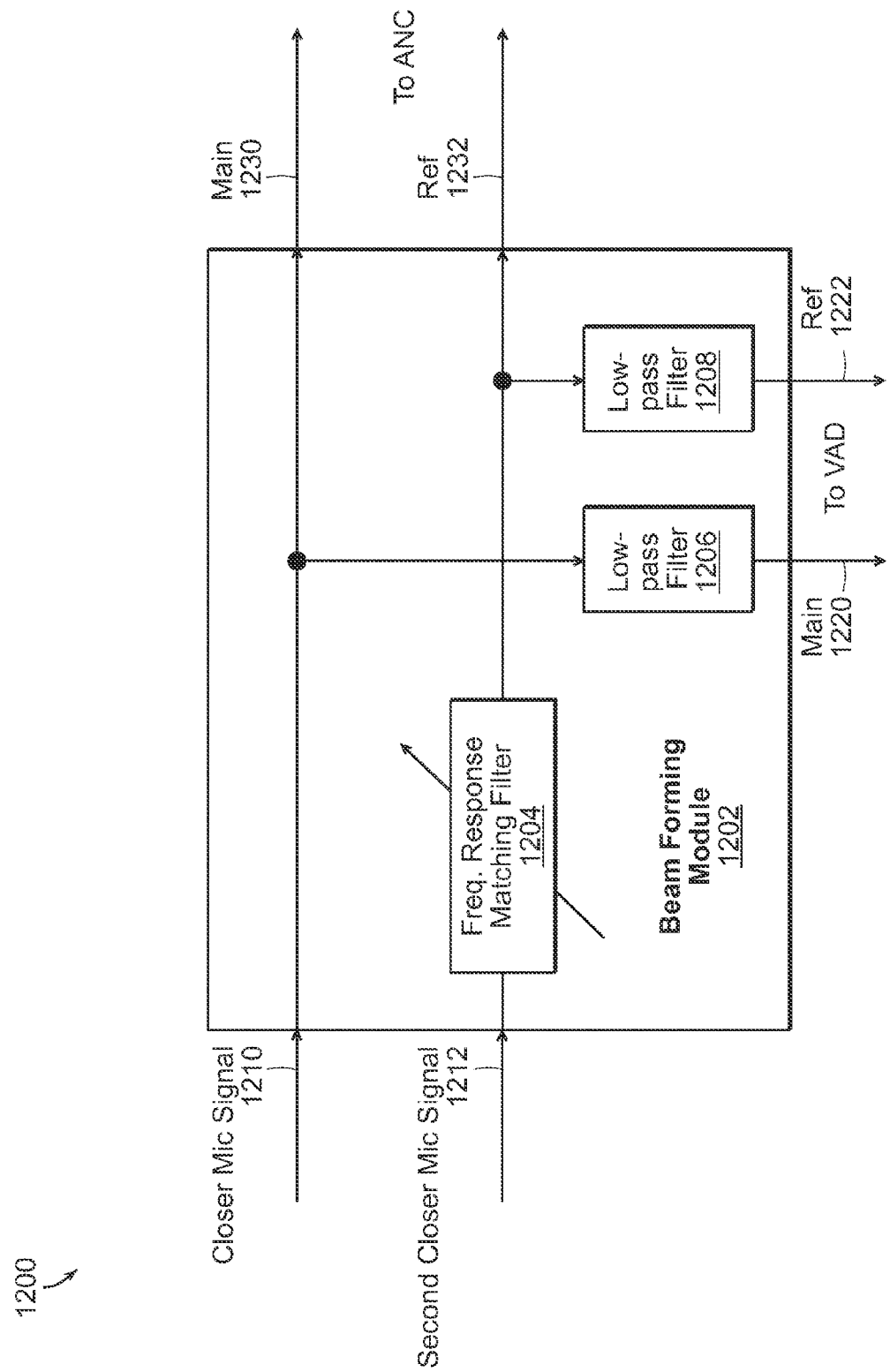
FIG. 12 is a block diagram illustrating an example embodiment of a beam-forming module that can be employed in a noise cancellation circuit of one embodiment of the invention.

FIG. 12 is a block diagram 1200 illustrating an example embodiment of a beam-forming module 1202 that can be employed in the noise cancelling circuit 1101 of the invention. The BF module 1202 receives the closer microphone signal 1210 and further (i.e., more distant from the desired sound) microphone signal 1212.

A further (i.e., more distant from the desired sound) microphone signal 1212 is inputted to a frequency response matching filter 1204. The frequency response matching filter 1204 adjusts gain, phase, and shapes the frequency response of the further microphone signal 1212. For example, the frequency response matching filter 1204 can adjust the signal for the distance between the two microphones, such that an outputted reference signal 1232 representative of the further microphone signal 1212 can be processed with the main signal 1230, representative of the closer microphone signal 1210. The main signal 1230 and reference signal 1232 are sent to the ANC module.

A closer (i.e., relatively close to the desired sound) microphone signal 1210 is outputted to the ANC module as a main signal 1230. The closer microphone signal 1210 is also inputted to a low-pass filter 1206. The reference signal 1232 is inputted to a low-pass filter 1208 to create a reference signal 1222 sent to the Desired VAD module. The low-pass filters 1206 and 1208 adjust the signal for a "close talk case" by, for example, having a gradual low off from 2 kHz to 4 kHz, in one embodiment. Other frequencies can be used for different designs and distances of the microphones to the user's mouth, however.

Figure 13:
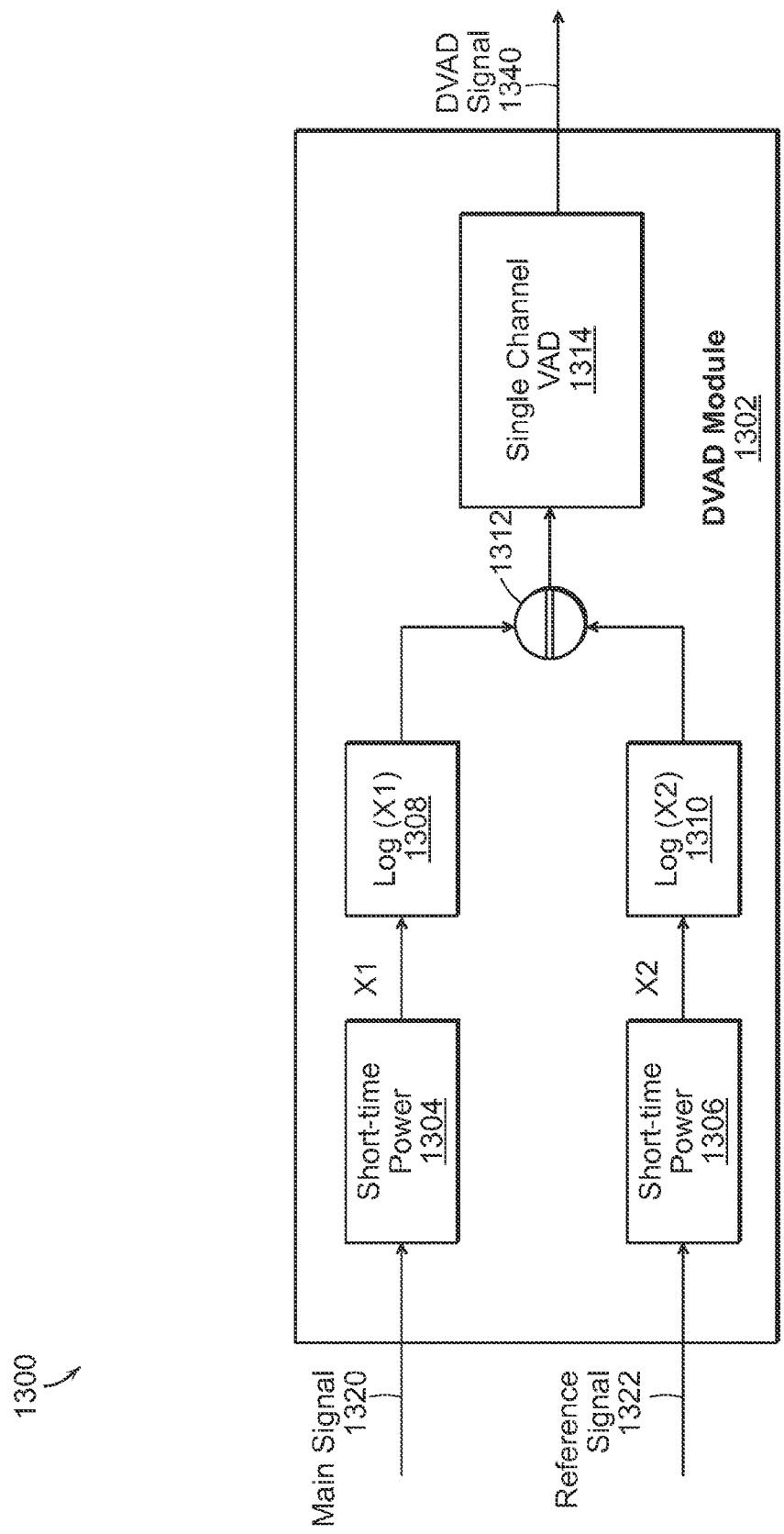
FIG. 13 is a block diagram illustrating an example embodiment of a desired voice activity detection model module suitable for use with the present invention.

FIG. 13 is a block diagram illustrating an example embodiment of a Desired Voice Activity Detection Module 1302. The DVAD module 1302 receives a main signal 1320 and a reference signal 1322 from the beam-forming module. The main signal 1320 and reference signal 1322 are processed by respective short-time power modules 1304 and 1306. The short-time power modules 1304 and 1306 can include a root mean square (RMS) detector, a power (PWR) detector, or an energy detector. The short-time power modules 304 and 306 output signals to respective amplifiers 1308 and 1310. The amplifiers can be logarithmic converters (or log/logarithmic amplifiers). The logarithmic converters 1308 and 1310 output to a combiner 1312. The combiner 1312 is configured to combine signals, such as the main signal and one of the at least one reference signals, to produce a voice activity difference signal by subtracting the detection(s) of the reference signal from the main signal (or vice-versa). The voice activity difference signal is inputted into a single channel VAD module 1314. The single channel VAD module can be a conventional VAD module. The single channel VAD 314 outputs the desired voice activity signal.

Figure 14:
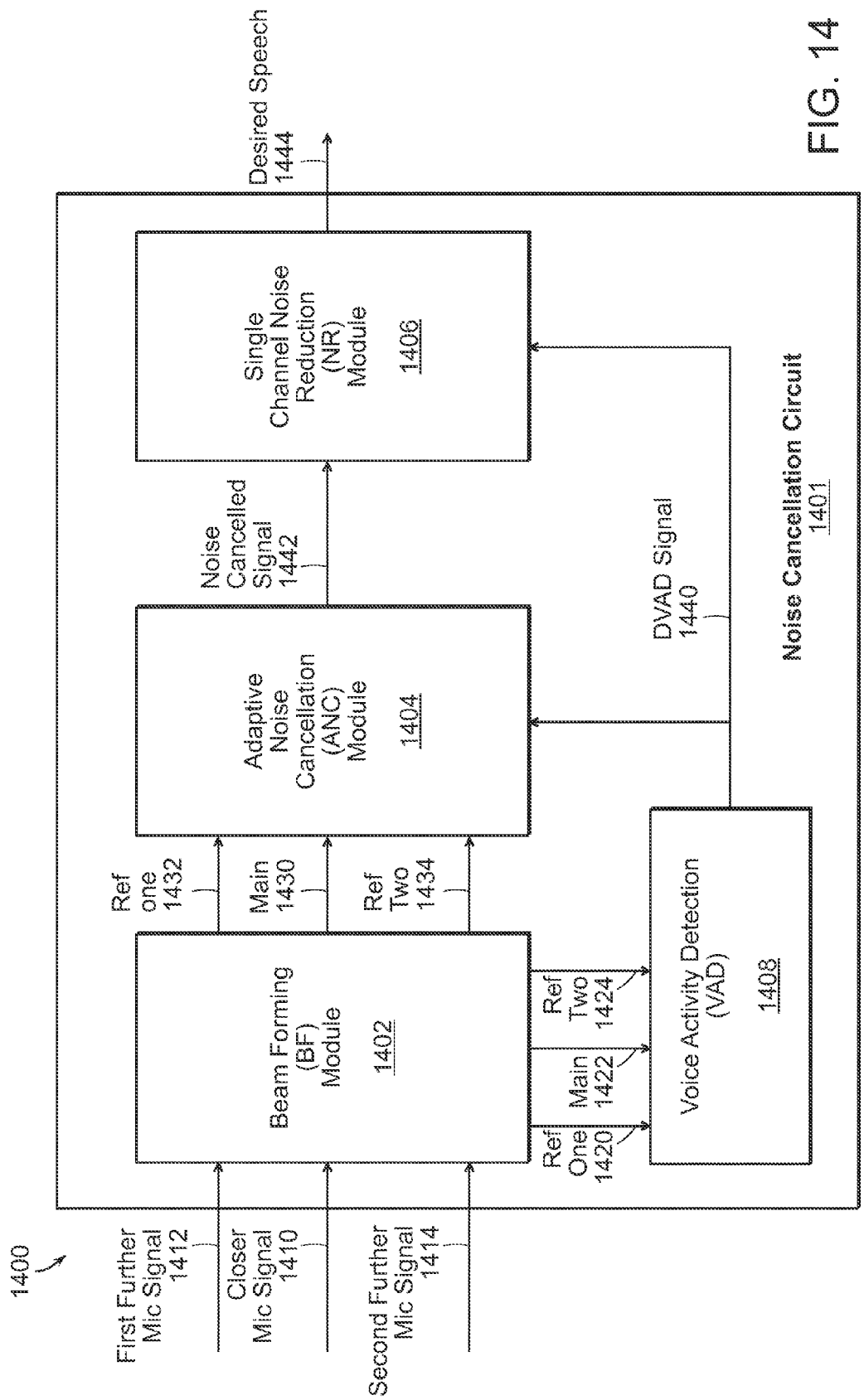
FIG. 14 is a block diagram illustrating an example embodiment of a noise cancellation circuit suitable for use in another embodiment of the claimed invention.

FIG. 14 is a block diagram 1400 illustrating an example embodiment of a noise cancellation circuit1 1401 employed to receive a closer microphone signal 1410 and a first and second further microphone signal 1412 and 1414, respectively. The noise cancellation circuit 1401 is similar to the noise cancellation circuit 1101 described in relation to FIG. 11, however, the noise cancellation circuit 1401 is employed to receives three signals instead of two. A beam-forming (BF) module 1402 is arranged to receive the signals 1410, 1412 and 1414 and output a main signal 1430, a first reference signal 1432 and second reference signal 1434 to an adaptive noise cancellation module 1404. The beam-forming module is further configured to output a main signal 1422, first reference signal 1420 and second reference signal 1424 to a voice activity detection (VAD) module 1408.

The ANC module 1404 produces a noise cancelled signal 1442 to a Single Channel Noise Reduction (NR) module 1406, similar to the ANC module 1104 of FIG. 11. The single NR module 1406 then outputs desired speech 1444. The VAD module 1408 outputs the DVAD signal to the ANC module 1404 and the single channel NR module 1406.

Figure 15:
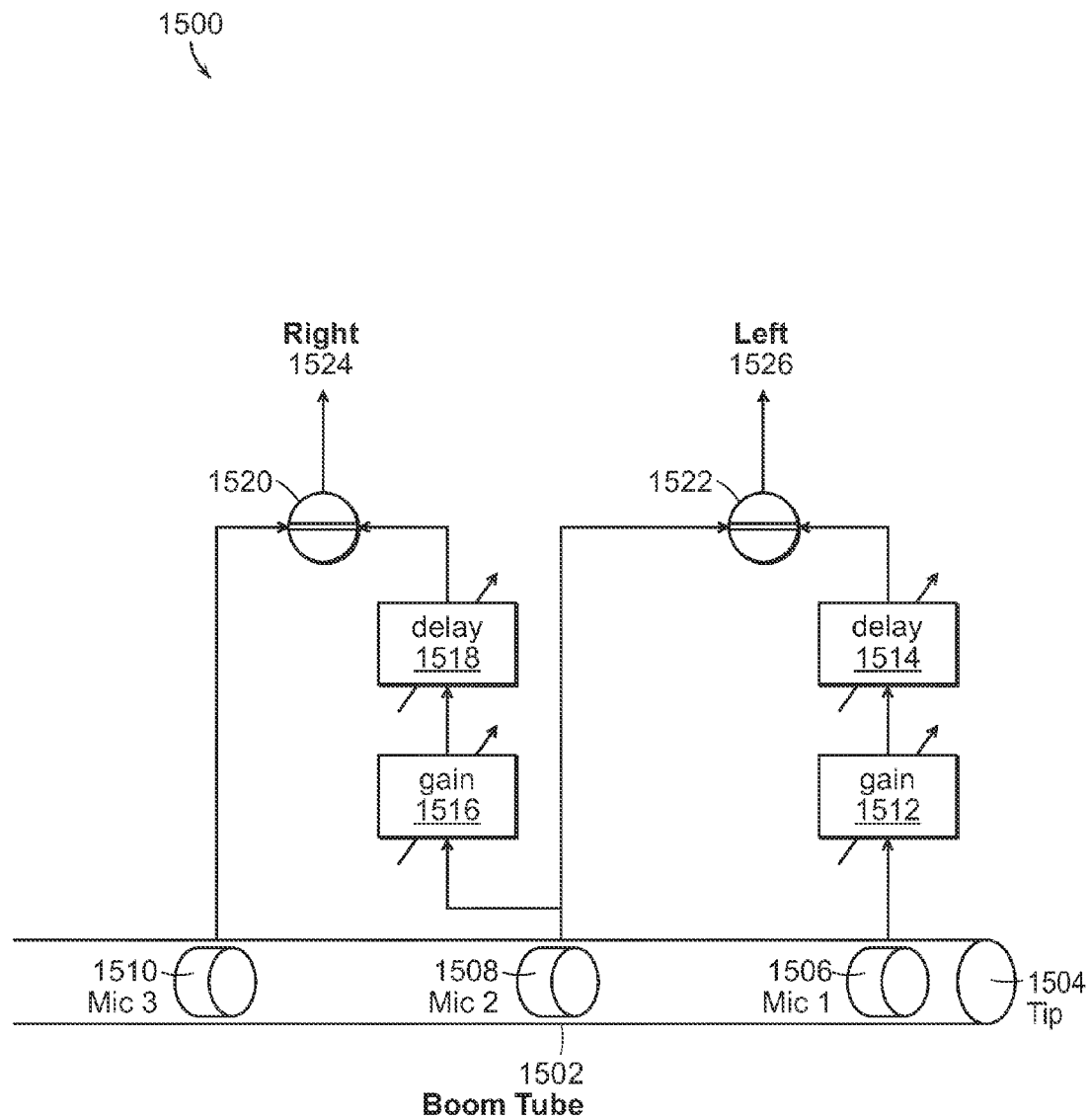
FIG. 15 is an example embodiment of beam-forming from a boom to housing three microphones according to another embodiment of the invention.

FIG. 15 is an example embodiment of beam-forming from a boom tube 1502 housing three microphones 1506, 1508, and 1510. A first microphone 1506 is arranged closest to a tip 1504 of the boom tube 1502, a second microphone 1508 is arranged in the boom tube 1502 further away from the tip 1504, and a third microphone 1510 is arranged in the boom tube 1502 even further away from the tip 1504. The first microphone 1506 and second microphone 1508 are arranged to provide data to output a left signal 1526. The first microphone is arranged to output its signal to a gain module 1512 and a delay module 1514, which is outputted to a combiner 1522. The second microphone is connected directly to the combiner 1522. The combiner 1522 subtracts the two provided signals to cancel noise, which creates the left signal 1526.

Likewise, the second microphone 1508 is connected to a gain module 1516 and a delay module 1518, which is outputted to a combiner 1520. The third microphone 510 is connected directly to the combiner 1520. The combiner 1520 subtracts the two provided signals to cancel noise, which creates the right signal 1520.

Figure 16:
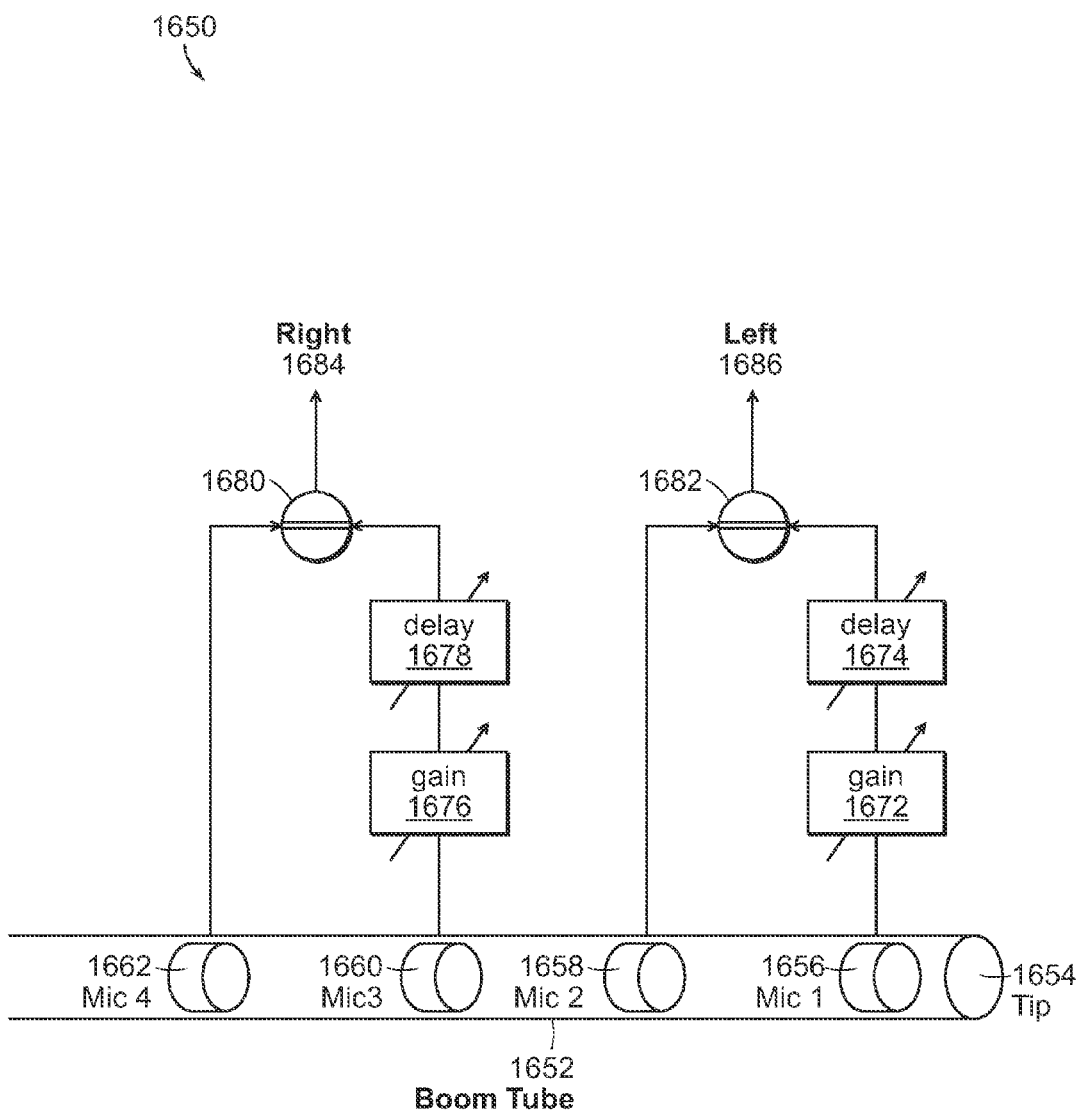
FIG. 16 is an example embodiment of beam-forming from a boom to the housing four microphones according to yet another embodiment of the invention.

FIG. 16 is an example embodiment of beam-forming from a boom tube 1652 housing four microphones 1656, 1658, 1660 and 1662. A first microphone 1656 is arranged closest to a tip 1654 of the boom tube 1652, a second microphone 1658 is arranged in the boom tube 1652 further away from the tip 1654, a third microphone 1660 is arranged in the boom tube 1652 even further away from the tip 1654, and a fourth microphone 1662 is arranged in the boom tube 1652 away from the tip 1654. The first microphone 1656 and second microphone 1658 are arranged to provide data to output a left signal 1686. The first microphone is arranged to output its signal to a gain module 1672 and a delay module 1674, which is outputted to a combiner 1682. The second microphone is connected directly to the combiner 1658. The combiner 1682 subtracts the two provided signals to cancel noise, which creates the left signal 1686.

Likewise, the third microphone 1660 is connected to a gain module 1676 and a delay module 1678, which is outputted to a combiner 1680. The fourth microphone 1662 is connected directly to the combiner 1680. The combiner 1680 subtracts the two provided signals to cancel noise, which creates the right signal 1684.

Figure 17:
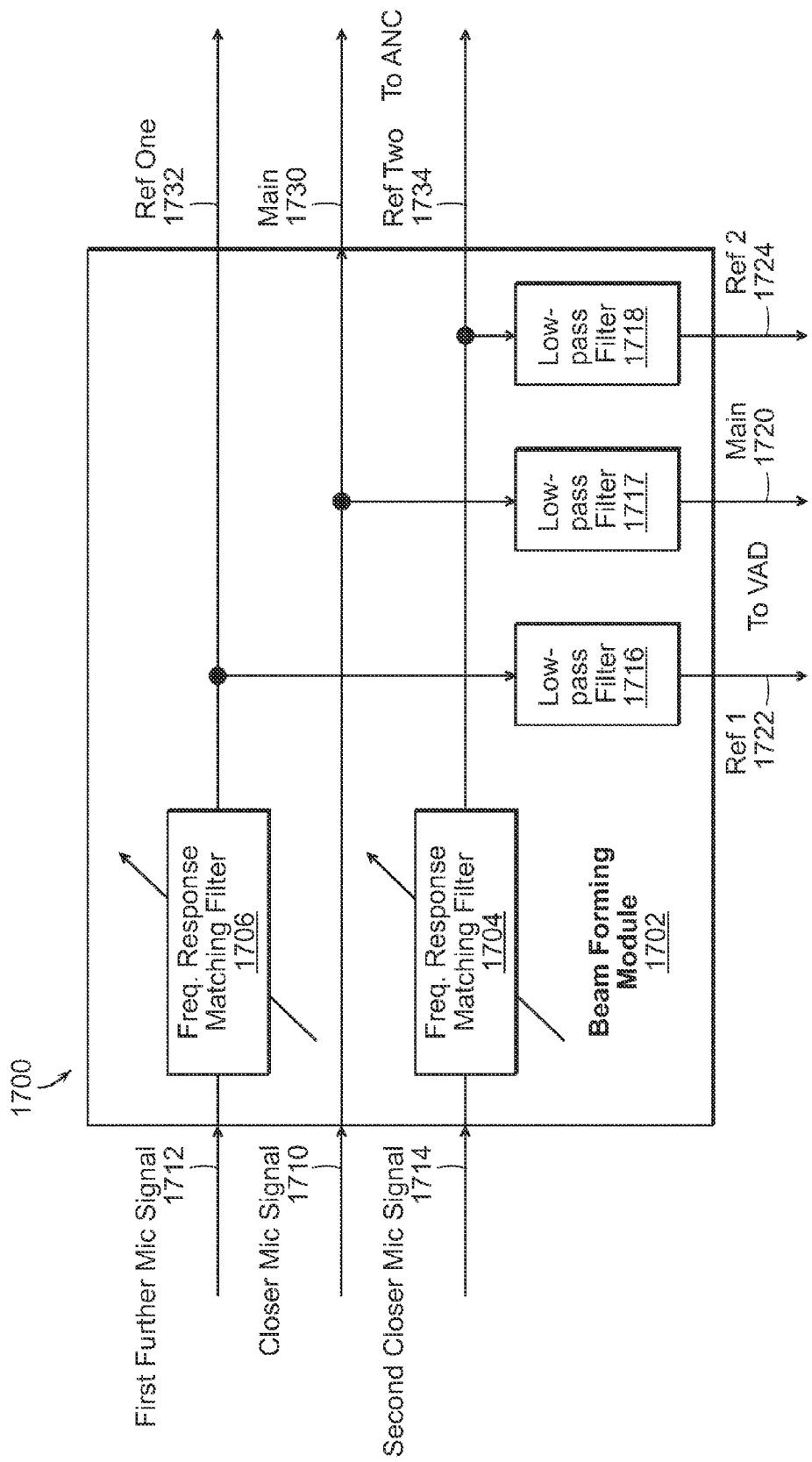
FIG. 17 is a block diagram illustrating an example embodiment of a beam-forming module accepting three signals according to still another embodiment of the invention.

FIG. 17 is a block diagram 1700 illustrating an example embodiment of a beam-forming module 1702 accepting three signals 1710, 1712 and 1714. A closer microphone signal 1710 is output as a main signal 1730 to the ANC module and also inputted to a low-pass filter 1717, to be outputted as a main signal 1720 to the VAD module. A first further microphone signal 1712 and second closer microphone signal 1714 are inputted to respective frequency response matching filters 1706 and 1704, the outputs of which are outputted to be a first reference signal 1732 and second reference signal 1734 to the ANC module. The outputs of the frequency response matching filters 1706 and 1704 are also outputted to low-pass filters 1716 and 1718, respectively, which output a first reference signal 1722 and second reference signal 1724, respectively.

Figure 18:
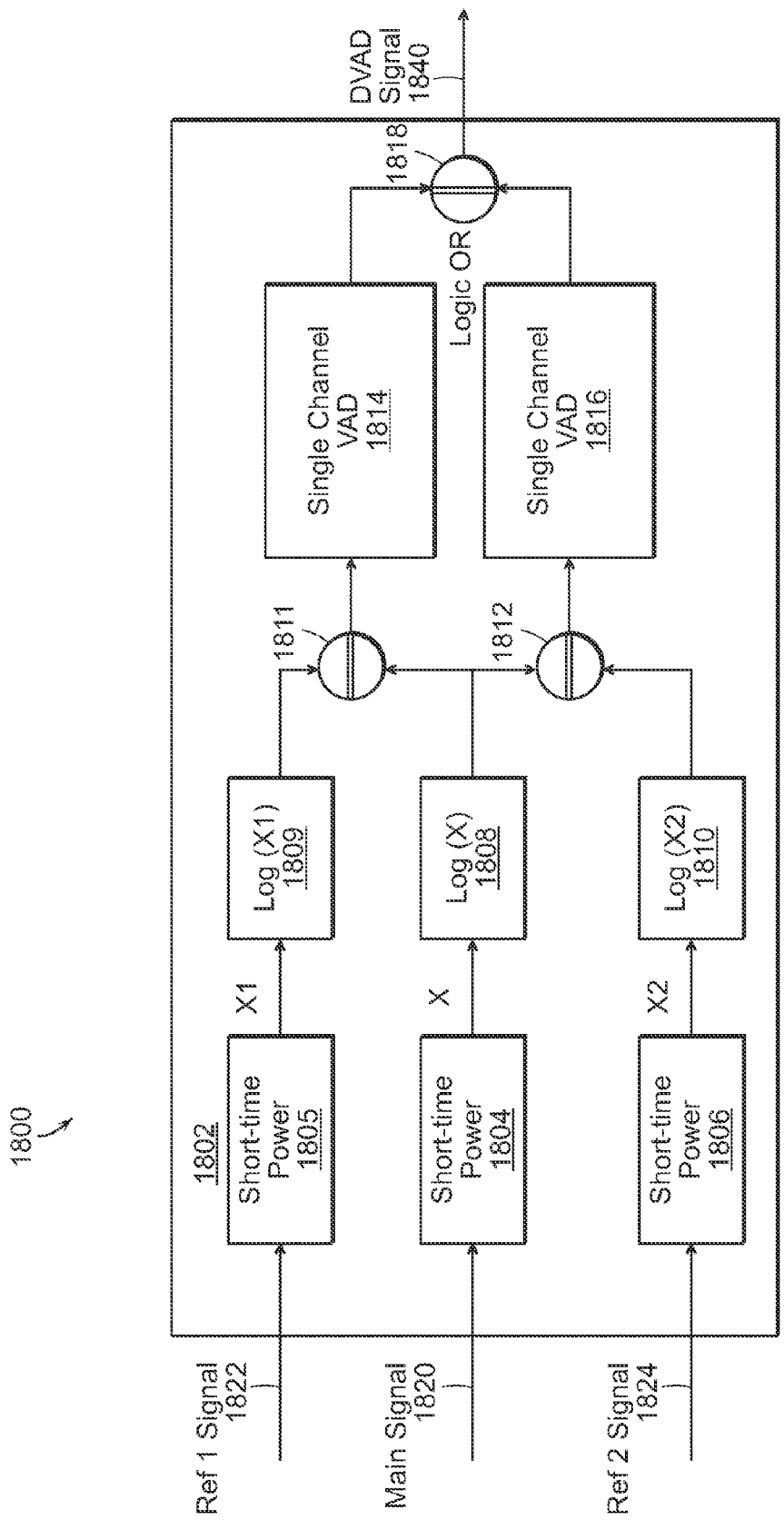
FIG. 18 is a block diagram illustrating example embodiments of a desired voice activity detection module according to another embodiment of the invention.

FIG. 18 is a block diagram 1800 illustrating an example embodiment of a desired voice activity detection (VAD) module 1802 accepting three signals 1820, 1822 and 1824. The VAD module 1802 receives a main signal 1820, a first reference signal 1822 and a second reference signal 1824 at short-time power modules 1804, 1805 and 1806, respectively. The short-time power modules 1804, 1805, and 1806 are similar to the short-time power modules described in relation to FIG. 13. The short-time power modules 1804, 1805, and 1806 output to respective amplifiers 1808, 1809 and 1810, which can each be a logarithmic converter. Amplifiers 1808 and 1809 output to a combiner module 1811, which subtracts the two signals and outputs the difference to a single channel VAD module 1814. Amplifiers 1810 and 1808 output to a combiner module 1812, which subtracts the two signals and outputs the difference to a single channel VAD module 1816. The single channel VAD modules 1814 and 1816 output to a logical OR-gate 1818, which outputs a DVAD signal 1840.

An example method of the present invention includes reducing noise in an eyewear device with a microphone array, including, coupling an array of microphones to an eyeglasses frame, the array of microphones including at least a first and second microphone, arranging the first microphone to couple to the eyeglasses frame about a temple region, the temple region being located approximately between a top corner of a lens opening and a support arm, arranging the second microphone to couple to the eyeglasses frame about an inner lower corner of the lens opening, and providing a first and second audio channel output from the first and second microphones, respectively. The second microphone can be positioned anywhere along the inner frame of the lens, for example the lower corner, upper corner, or inner frame edge. Further, the second microphone can be along the inner edge of the lens at either the left or right of the nose bridge.

Example methods can further include forming beams at a beam-former, the beam-former receiving at least the first and second audio channels and outputting a main channel and one or more reference channels, detecting voice activity at a voice activity detector, the voice activity detector receiving the main and reference channels and outputting a desired voice activity channel, adaptively cancelling noise at an adaptive noise canceller, the adaptive noise canceller receiving the main, reference, and desired voice activity channels and outputting an adaptive noise cancellation channel, and reducing noise at a noise reducer receiving the desired voice activity and adaptive noise cancellation channels and outputting a desired speech channel. In example methods, the first and second audio channels can be produced digitally and the beams can be formed digitally.

Example methods of reducing noise can further include arranging a third microphone to couple to the eyeglasses frame about an outer lower corner of the lens opening below the first microphone, arranging a fourth microphone to couple to the eyeglasses frame about a bridge support region above the second microphone, and providing a third and fourth audio channel output from the third and fourth microphones, respectively.

According to example methods of reducing noise, an array of omni-directional microphones can be coupled to the eyeglasses frame. The coupled array of omni-directional microphones are any combination of the following: electret condenser microphones, analog microelectromechanical systems (MEMS) microphones, or digital MEMS microphones.

Example methods of reducing noise can include coupling the array of microphones to the eyeglasses frame using at least one flexible printed circuit board (PCB) strip. Coupling the array of microphones to the eyeglasses frame can include using an upper flexible PBC strip including the first and fourth microphones and a lower flexible PCB strip including the second and third microphones.

In example methods, coupling the array of microphones to the eyeglasses frame can further include coupling each microphone of the array of microphones to a corresponding vent of an array of vents, the array of microphones being bottom port or top port microelectromechanical system (MEMS) microphones and the vents being located in the eyeglasses frame, wherein the first and fourth MEMS microphones are coupled to the upper flexible PCB strip and the second and third MEMS microphones are coupled to the lower flexible PCB strip, and arranging the array of MEMS microphones such that the ports received acoustic signals through the corresponding vents. Coupling can include coupling a membrane between the eyeglasses frame and the microphones. Example methods can include wind-screen and water-proofing the array of microphones using the membrane, the membrane being made of a wind-screen and water-proofing material.

In still further example embodiments, an eyewear device can include means for coupling an array of microphones to an eyeglasses frame, the array of microphones including at least a first and second microphone, means for arranging the first microphone coupled to the eyeglasses frame about a temple region, the temple region being located approximately between a top corner of a lens opening and a support arm, means for arranging the second microphone coupled to the eyeglasses frame about an inner lower corner of the lens opening, and means for providing a first and second audio channel output from the first and second microphones, respectively. The second microphone can be positioned anywhere along the inner frame of the lens, for example the lower corner, upper corner, or inner frame edge. Further, the second microphone can be along the inner edge of the lens at either the left or right of the nose bridge.

In a still further example process of reducing noise can be executed on a non-transitory computer program product, including a computer readable medium having computer readable instructions stored thereon. The computer readable instructions when loaded and executed by a processor can cause the processor to form beams based on at least two audio channel inputs and produce a main channel and one or more reference channels, detect voice activity based on the main and reference channels and produce a desired voice activity channel, adaptively cancel noise based on the main, reference, and desired voice activity channels and produce an adaptive noise cancellation channel, and reduce noise based on the desired voice activity and adaptive noise cancellation channels and output a desired speech channel.

Further example embodiments of the present invention may be configured using a computer program product; for example, controls may be programmed in software for implementing example embodiments of the present invention. Further example embodiments of the present invention may include a non-transitory computer readable medium containing instruction that may be executed by a processor, and, when executed, cause the processor to complete methods described herein. It should be understood that elements of the block and flow diagrams described herein may be implemented in software, hardware, firmware, or other similar implementation determined in the future. In addition, the elements of the block and flow diagrams described herein may be combined or divided in any manner in software, hardware, or firmware. If implemented in software, the software may be written in any language that can support the example embodiments disclosed herein. The software may be stored in any form of computer readable medium, such as random access memory (RAM), read only memory (ROM), compact disk read only memory (CD-ROM), "Flash" memory and so forth. In operation, a general purpose or application specific processor loads and executes software in a manner well understood in the art. It should be understood further that the block and flow diagrams may include more or fewer elements, be arranged or oriented differently, or be represented differently. It should be understood that implementation may dictate the block, flow, and/or network diagrams and the number of block and flow diagrams illustrating the execution of embodiments of the invention.

The teachings of all patents, published applications and references cited herein are incorporated by reference in their entirety.

While this invention has been particularly shown and described with references to example embodiments thereof, it will be understood by those skilled in the art that various changes in form and details may be made therein without departing from the scope of the invention encompassed by the appended claims.

What is claimed is:

1. An eyewear device, comprising:
   a) a front frame member defining opposite ends and a lens opening, wherein the lens opening includes at least one top corner proximate to at least one of the opposite ends and an inner edge;
   b) a side frame member extending from each of the opposite ends;
   c) an array of microphones, the array including at least:
      i) a first microphone coupled to at least one of the front frame member and a side frame member at a temple region, the temple region being proximate to a juncture between the front frame member and the side frame member,
      ii) a second microphone coupled to and proximate to the inner edge of the lens opening;
      iii) a third microphone coupled to the front frame member at an outer lower corner of the lens opening below the first microphone, and
      iv) a fourth microphone coupled to the front frame member at a bridge support region above the second microphone; and
   d) a first audio channel output extending from the first microphone;
   e) a second audio channel output extending from the second microphone;
   f) a third audio channel output extending from the third microphone; and
   g) a fourth audio channel output extending from the fourth microphone.

2. The eyewear device of claim 1, further including a digital signal processor having:
   a) a beam-former electronically linked to the first and second microphones, for receiving at least the first and second audio channels and outputting a main channel and one or more reference channels;
   b) a voice activity detector electronically linked to the beam-former, for receiving the main and reference channels and outputting a desired voice activity channel;
   c) an adaptive noise canceller electronically linked to the beam-former and the voice activity detector for receiving the main, reference, and desired voice activity channels and outputting an adaptive noise cancellation channel; and
   d) a noise reducer electronically linked to the voice activity detector and the adaptive noise canceller for receiving the desired voice activity and adaptive noise cancellation channels and outputting a desired speech channel.

3. The eyewear device of claim 2, wherein the array of microphones are digital microphones and the beam-former is a digital beam-former.

4. The eyewear device of claim 1, wherein the array of microphones are omni-directional microphones.

5. The eyewear device of claim 4, wherein the omni-directional microphones are any combination of the following: electret condenser microphones, analog microelectromechanical systems (MEMS) microphones, or digital MEMS microphones.

6. The eyewear device of claim 1, wherein the array of microphones is coupled to the front frame member using at least one flexible printed circuit board (PCB) strip.

7. The eyewear device of claim 6, wherein the array of microphones is coupled to the front frame member using an upper flexible PCB strip including the first and fourth microphones and a lower flexible PCB strip including the second and third microphones.

8. The eyewear device of claim 7, wherein:
   a) the front frame member further includes an array of vents corresponding to the array of microphones;
   b) the array of microphones are bottom port microelectromechanical systems (MEMS) microphones;
   c) the first and fourth MEMS microphones are coupled to the upper flexible PCB strip;
   d) the second and third MEMS microphones are coupled to the lower flexible PCB strip; and
   e) the array of MEMS microphones being arranged such that the bottom ports receive acoustic signals through the corresponding vents.

9. The eyewear device of claim 8, further including a membrane sandwiched between the front frame member and the microphone.

10. The eyewear device of claim 9, wherein the membrane is a wind-screen membrane and a water-proofing membrane.

11. A method of reducing noise in an eyewear device with a microphone array, the method comprising the steps of:
    a) coupling an array of microphones to an eyeglasses frame that includes a front frame member defining opposite ends and at least one lens opening, wherein the lens opening includes at least one top corner proximate to at least one of the opposite ends and an inner edge, the array of microphones including at least a first and a second microphone;
    b) arranging the first microphone to couple to the eyeglasses frame about a temple region, the temple region being located approximately between the top corner of the at least one lens opening and a side frame member extending from the front frame member at the temple region;
    c) arranging the second microphone to couple to the eyeglasses frame about an inner edge of the lens opening;
    d) providing a first and second audio channel output from the first and second microphones, respectively;
    e) arranging a third microphone to couple to the eyeglasses frame about an outer lower corner of the lens opening below the first microphone;
    f) arranging a fourth microphone to couple to the eyeglasses frame about a bridge support region above the second microphone; and
    g) providing a third and fourth audio channel output from the third and fourth microphones, respectively.

12. The method reducing noise of claim 11, further including the steps of:
    a) forming beams at a beam-former, the beam-former receiving at least the first and second audio channels and outputting a main channel and one or more reference channels;
    b) detecting voice activity at a voice activity detector, the voice activity detector receiving the main and reference channels and outputting a desired voice activity channel;

c) adaptively cancelling noise at an adaptive noise canceller, the adaptive noise canceller receiving the main, reference, and desired voice activity channels and outputting an adaptive noise cancellation channel; and d) reducing noise at a noise reducer receiving the desired voice activity and adaptive noise cancellation channels and outputting a desired speech channel.

13. The noise reduction method of claim 12, wherein the first and second audio channels are produced digitally and the beams are formed digitally.

14. The method of reducing noise of claim 11, wherein an array of omni-directional microphones are coupled to the eyeglasses frame.

15. The method of reducing noise of claim 14, wherein the coupled array of omni-directional microphones are any combination of the following: electret condenser microphones, analog microelectromechanical systems (MEMS) microphones, or digital MEMS microphones.

16. The method of reducing noise of claim 11, wherein coupling the array of microphones to the eyeglasses frame uses at least one flexible printed circuit board (PCB) strip.

17. The method of reducing noise of claim 16, wherein coupling the array of microphones to the eyeglasses frame uses an upper flexible PCB strip including the first and fourth microphones and a lower flexible PCB strip including the second and third microphones.

18. The method of reducing noise of claim 17, wherein coupling the array of microphones to the eyeglasses frame further includes:

a) coupling each microphone of the array of microphones to a corresponding vent of an array of vents, the array of microphones being bottom port or top port microelectromechanical system (MEMS) microphones and the vents being located in the eyeglasses frame, wherein the first and fourth MEMS microphones are coupled to the upper flexible PCB strip and the second and third MEMS microphones are coupled to the lower flexible PCB strip; and b) arranging the array of MEMS microphones such that the ports received acoustic signals through the corresponding vents.

19. The method of reducing noise of claim 18, further including coupling a membrane between the eyeglasses frame and the microphones.

20. The method of claim 19, further including windscreening and water-proofing the array of microphones using the membrane, the membrane being made of a windscreen and water-proofing material.

21. An eyewear device, comprising:

a) an array of microphones coupled to an eyeglasses frame that includes a front frame member defining opposite ends and at least one lens opening, wherein the lens opening includes at least one top corner proximate to at least one of the opposite ends and an inner edge, the array of microphones including at least a first, a second microphone, a third microphone and a fourth microphone, wherein
  i) the first microphone is coupled to the eyeglasses frame about a temple region, the temple region being located approximately between the top corner of the at least one side frame member extending from the front frame member at the temple region, lens opening and;
  ii) the second microphone is coupled to the eyeglasses frame about an inner edge of the lens opening,
  iii) the third microphone coupled to the eyeglasses frame and being located beneath and approximately vertically with the first microphone, and
  iv) the fourth microphone coupled to the eyeglasses frame and being approximately vertically with the second microphone; and b) a first audio channel output, a second audio channel, a third audio channel output, and a fourth audio channel output from the first, second, third, and fourth microphones, respectively.

* * * * *